(12) United States Patent
Zimmer

(10) Patent No.: US 7,530,441 B2
(45) Date of Patent: May 12, 2009

(54) SORTATION CONVEYOR AND CROSSOVER SWITCH THEREFOR

(75) Inventor: Justin J. Zimmer, Mason, OH (US)

(73) Assignee: Intelligrated, Inc., Mason, OH (US)

( * ) Notice: Subject to any disclaimer, the term of this patent is extended or adjusted under 35 U.S.C. 154(b) by 190 days.

(21) Appl. No.: 11/448,606

(22) Filed: Jun. 6, 2006

(65) Prior Publication Data

US 2007/0289839 A1    Dec. 20, 2007

(51) Int. Cl.
*B65G 47/46* (2006.01)
(52) U.S. Cl. ............... 198/370.02; 198/370.03
(58) Field of Classification Search ............ 198/370.01, 198/370.02, 370.03
See application file for complete search history.

(56) References Cited

U.S. PATENT DOCUMENTS

| | | | |
|---|---|---|---|
| 3,608,698 A | 9/1971 | Crall | |
| 3,986,596 A | 10/1976 | Hamilton | |
| 3,987,888 A | 10/1976 | Wickam | |
| 4,003,465 A * | 1/1977 | Bauer | 198/442 |
| 4,508,206 A | 4/1985 | Moore et al. | |
| 4,637,508 A | 1/1987 | Kikuchi et al. | |
| 4,717,011 A | 1/1988 | Yu et al. | |
| 4,732,259 A | 3/1988 | Yu et al. | |
| 4,738,347 A | 4/1988 | Brouwer et al. | |
| 4,760,908 A | 8/1988 | Houghton | |
| 4,946,022 A | 8/1990 | Davis et al. | |
| 4,971,190 A | 11/1990 | Berends et al. | |
| 5,131,522 A | 7/1992 | Fujio | |
| 5,135,100 A | 8/1992 | Cotter et al. | |
| 5,165,515 A | 11/1992 | Nitschke et al. | |
| 5,275,273 A * | 1/1994 | Veit et al. | 198/370.02 |
| 5,333,715 A | 8/1994 | Sapp | |
| 5,409,095 A | 4/1995 | Hoshi et al. | |
| 5,595,279 A | 1/1997 | Wilkins et al. | |
| 5,613,591 A | 3/1997 | Heit et al. | |
| 5,927,466 A | 7/1999 | Rowley | |
| 5,967,289 A | 10/1999 | Kelsey | |
| 6,044,958 A | 4/2000 | Emery | |
| 6,390,274 B1 * | 5/2002 | Snedecor | 198/370.02 |
| 6,398,009 B1 | 6/2002 | Emery | |
| 6,478,144 B1 | 11/2002 | Sweazy | |
| 6,513,642 B1 | 2/2003 | Shearer, Jr. et al. | |
| 6,615,972 B2 | 9/2003 | Veit et al. | |
| 6,702,106 B1 | 3/2004 | Sweazy | |
| 2002/0185358 A1 | 12/2002 | Zeitler et al. | |

* cited by examiner

*Primary Examiner*—James R Bidwell
(74) *Attorney, Agent, or Firm*—Frost Brown Todd LLC

(57) ABSTRACT

A crossover switch for a sortation conveyor has actuators that extend into the divert guide path which are operable to respond to the travel of a guide element through the path to move the switch element from one position to another.

10 Claims, 23 Drawing Sheets

US 7,530,441 B2

SORTATION CONVEYOR AND CROSSOVER SWITCH THEREFOR

TECHNICAL FIELD

The present invention relates generally to conveyors, and more particularly to sortation conveyors having spur conveyors extending laterally from both sides of the sortation conveyor. The invention will be disclosed in connection with, but not necessarily limited to, a crossover switch used with a sortation conveyor having one or more pairs of laterally aligned spur conveyors.

BACKGROUND

Pusher shoe sortation conveyors are well known for directing articles on the conveyor to a desired path. In general, such sortation conveyors include a longitudinally moving endless conveying surface for carrying articles. Pusher shoes, also referred to as pushers or shoes, are carried by the conveyor, configured to be selectively directed to move across the lateral width of the sortation conveyor by actuation of a switch. The switch directs the pusher from a home path, along an outside edge of the sortation conveyor, onto a divert guide path underlying the conveying surface conveyor. The guide path, typically defined by a guide track, causes the pusher to move laterally so as to engage an article and divert it onto a spur conveyor.

With dual sided sorters, there are laterally aligned spur conveyors so that articles carried on the conveying surface may be selectively diverted to either side as desired. When such alternative divert paths are laterally aligned, there are two oppositely directed divert guide paths which cross under the conveying surface. A crossover switch is required at the intersection to keep the pushers moving on the correct path through the intersection.

U.S. Pat. No. 6,860,376, issued Mar. 1, 2005, and U.S. patent application Ser. No. 10/800,070 filed on Mar. 12, 2004, are hereby incorporated by reference.

BRIEF DESCRIPTION OF THE DRAWINGS

The accompanying drawings, which are incorporated in and constitute a part of this specification, illustrate embodiments of the invention, and, together with the general description of the invention given above, and the detailed description of the embodiments given below, serve to explain the principles of the present invention.

Figure 1:
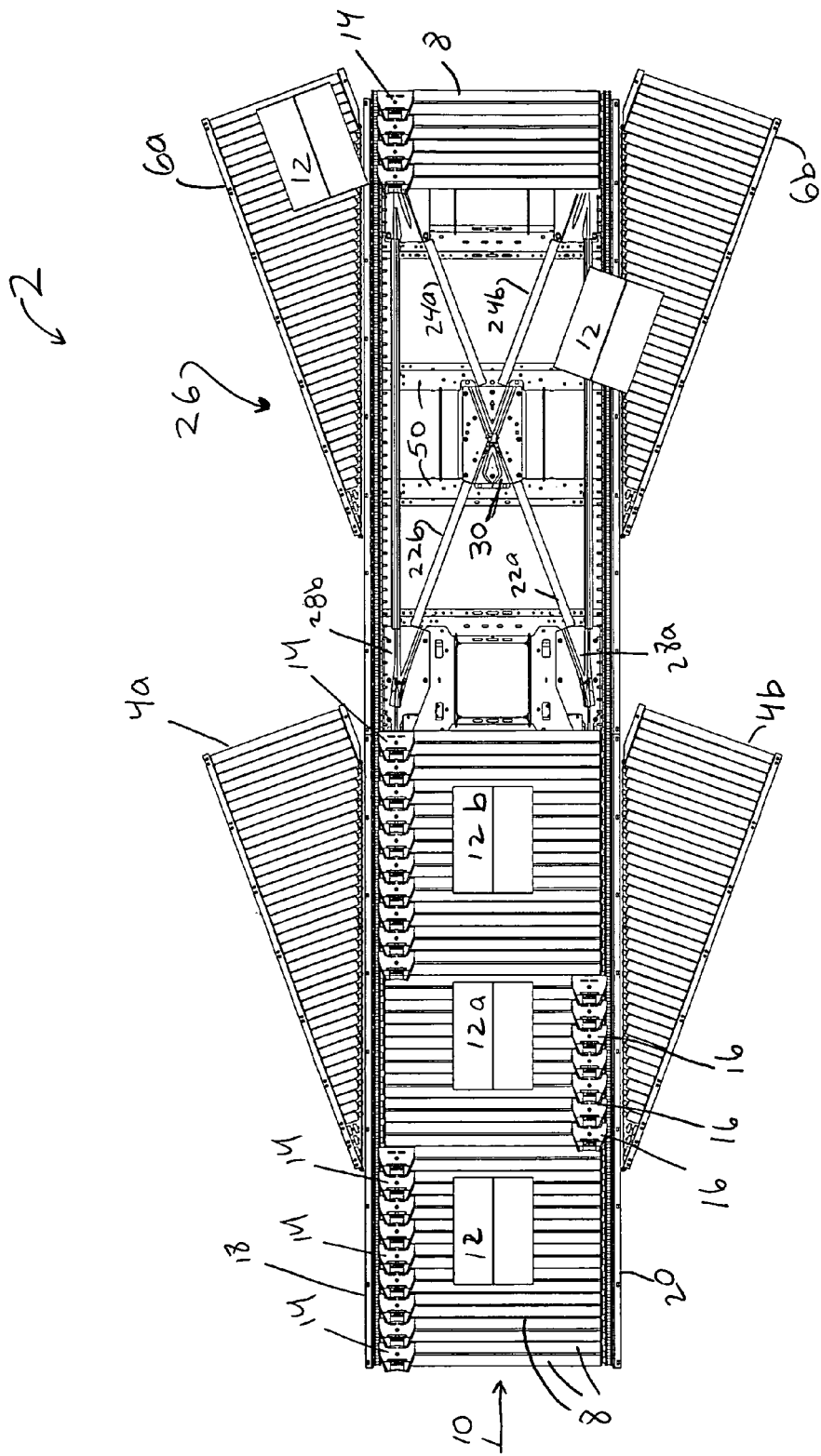
FIG. 1 is a top view of a dual sided sortation conveyor.

Reference will now be made in detail to the present preferred embodiment of the invention, an example of which is illustrated in the accompanying drawings.

DETAILED DESCRIPTION

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations. Referring in more detail to the drawings, an embodiment of the invention will now be described.

Referring to FIG. 1, there is shown sortation conveyor, generally indicated at 2, configured as a dual or double sided sortation conveyor having pairs of laterally extending, laterally aligned spur conveyors 4a and 4b, and 6a and 6b. Sortation conveyor may have any number of spur conveyors, and may have spur conveyors on either side that do not have a corresponding laterally aligned spur conveyor. In the embodiment depicted, sortation conveyor 2 has a plurality of laterally extending members 8 which move in the longitudinal direction indicated by direction of travel arrow 10 driven by any suitable drive mechanism (not shown), as is well known. Members 8 are arranged to define a conveying surface on which packages, such as indicated at 12, are carried.

Sortation conveyor 2 includes a plurality of pusher shoes 14 and 16 disposed for lateral movement across conveyor 2. Pushers 14 and 16 are illustrated as dual sided pushers, and are carried by members 8 in any suitable manner as is known in the art. Members 8 may be flat slats or tubes, and may be arranged in pairs which support a respective pusher 14 or 16.

Sortation conveyor 2, which may be constructed in sections, includes two spaced apart frame sides 18 and 20, which may be comprised of individual sections secured together. Pushers 14 and 16 are identical pushers, and are given different identifying numerals herein to designate their home path locations along the outer edges of sortation conveyor 2 adjacent frame members 18 and 20, respectively. As is well known, pushers 14 and 16 are selectively disposed to travel along either home path depending on to which direction articles 12 are to be diverted. For example package 12a will be diverted those of by pushers 16 which are aligned with package 12a to the left (in the direction toward frame member 18 in FIG. 1) relative to the direction of longitudinal travel, and package 12b will be diverted by those of pushers 14 which are aligned with package 12b to the right.

In FIG. 1, several members 8 have been omitted to show divert guide tracks 22a and 24a, and 22b and 24b, which define the divert guide paths followed by pushers 16 and 14 at divert location 26 to divert packages to spur conveyor 6a or 6b respectively. Sortation conveyor may have any suitable number of divert locations, whether single diverts or dual diverts. Each divert guide path includes divert switch 28a and 28b, which is selectively actuated to divert pushers 14 and 16 from their respective home paths onto a respective divert guide path so as to divert articles to a desired spur conveyor.

At the intersection of the two divert guide paths of a single divert location, such as divert location 26, crossover switch 30 is disposed. Crossover switch 30 maintains a diverted pusher on the correct divert guide path. For example, pushers 14 following divert guide track 22*b* are directed by crossover switch 30 onto divert guide track 24*b* and pushers 16 following divert guide track 22*a* are directed by crossover switch 30 onto divert guide track 24*a*.

Figure 2:
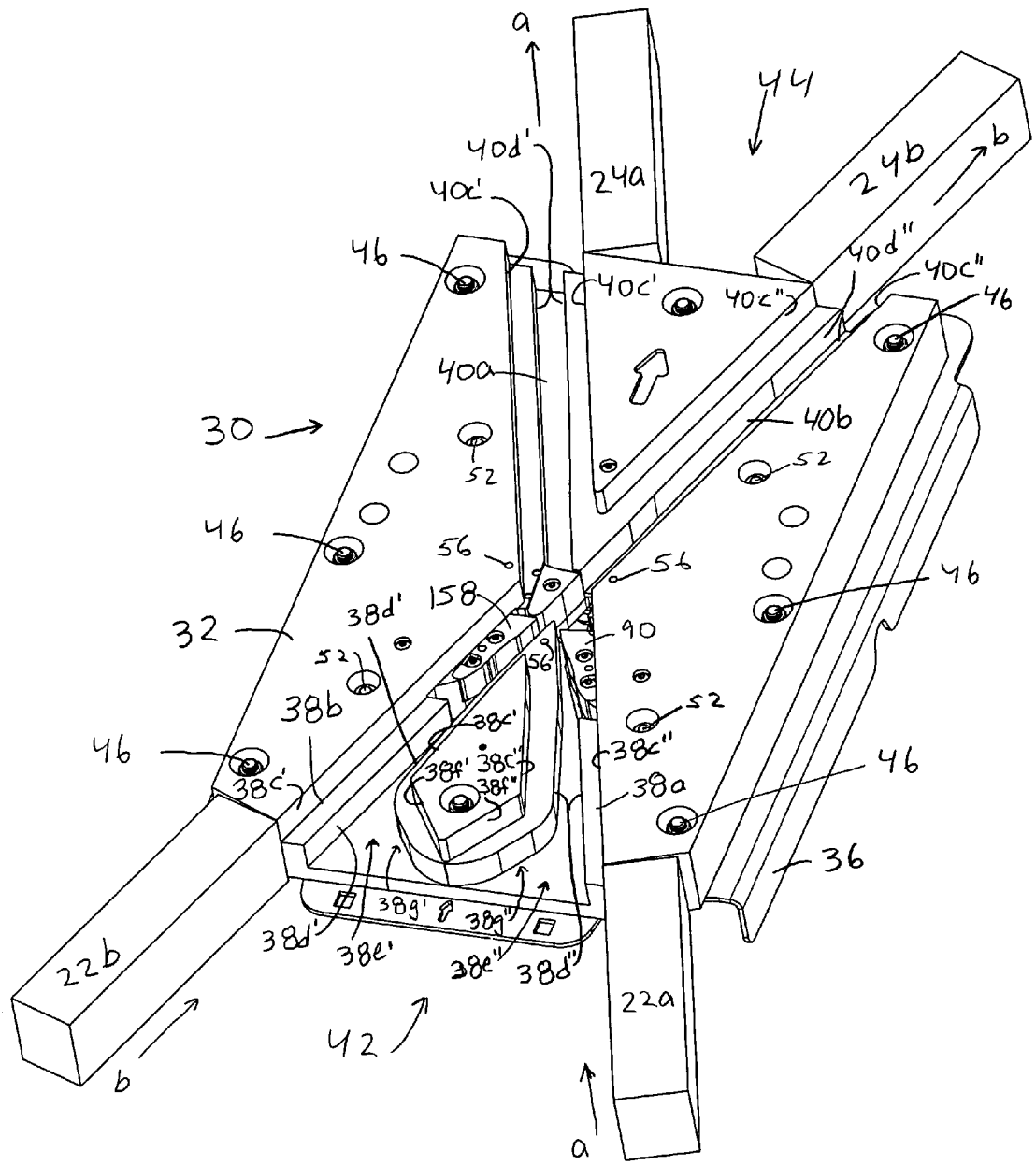
FIG. 2 is a top perspective view of a crossover switch constructed accordance with teachings of the present invention, with fragments of the adjacent guide tracks.
Figure 3:
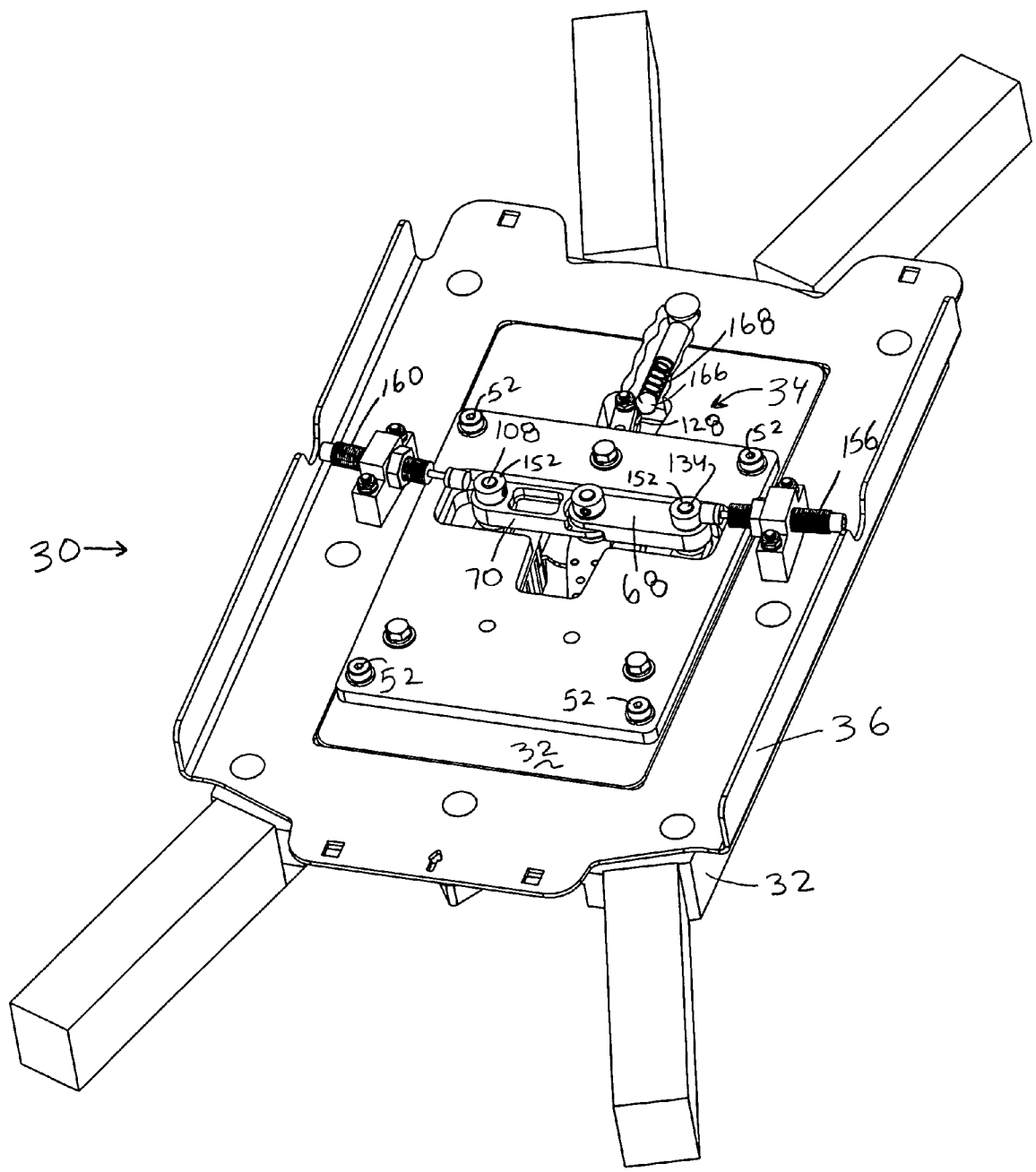
FIG. 3 is a bottom perspective view of the crossover switch of FIG. 1.
Figure 4:
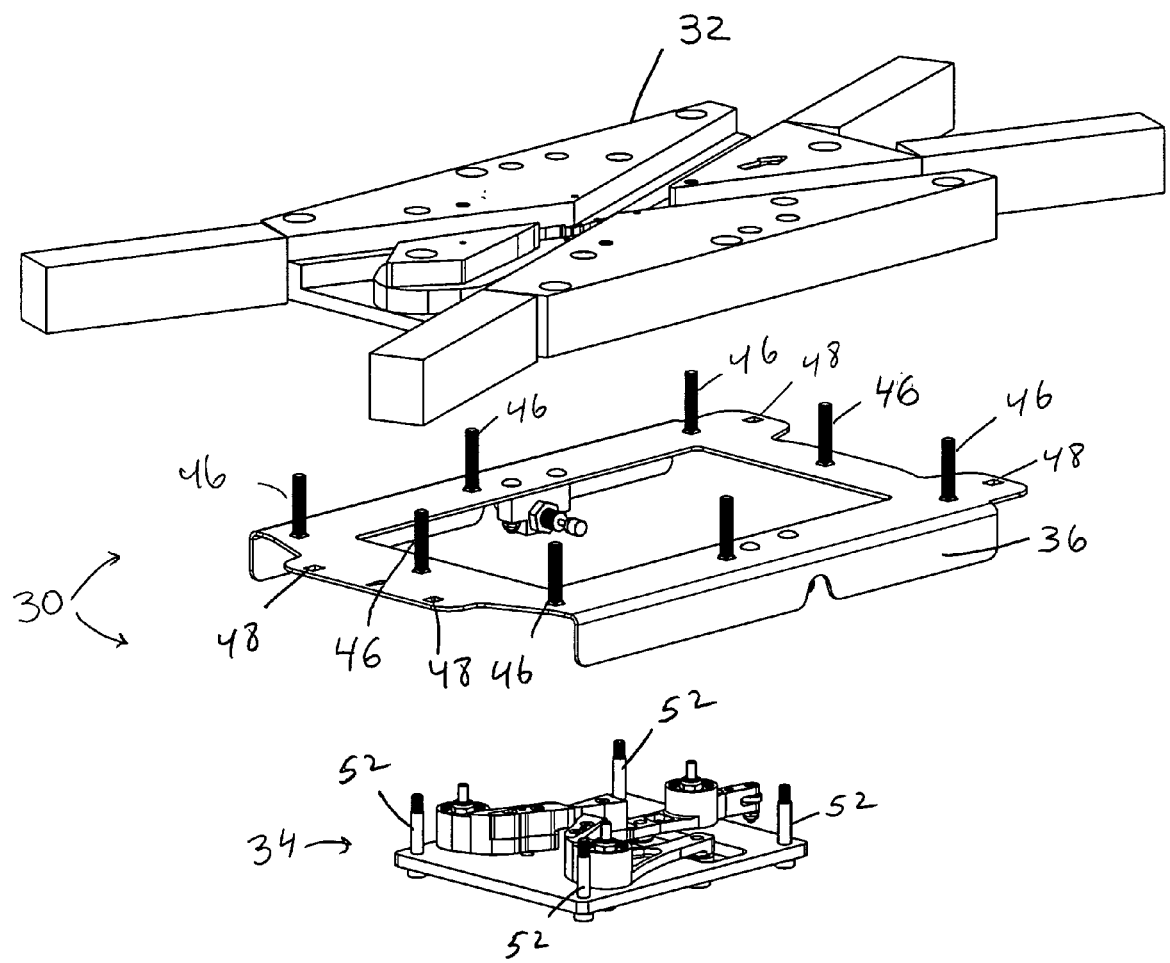
FIG. 4 is an exploded, top perspective view of the crossover switch of FIG. 1.

FIG. 2 illustrates crossover switch 30 constructed in accordance with teachings of the present invention. Referring also to FIGS. 3 and 4, in the embodiment depicted, crossover switch 30 comprises guide block 32, switch assembly 34 and mounting bracket 36. Guide block 32 is a body which defines two divert guide tracks 38*a* and 40*a*, and 38*b* and 40*b*, which define respective portions of the two respective divert guide paths which have been generally referenced herein by the suffix a and b following an identifying number. For simplicity and clarity, the two divert guide paths at divert location 26 in the embodiment depicted will be referred to as a and b. Guide block 32 is illustrated as being of unitary construction with divert guide tracks 38*a*, 38*b*, 40*a* and 40*b* formed therein, but may comprise a non unitary construction. Guide block 32 may be made of any suitable material, such as UHMW.

In the embodiment depicted, tracks 38*a*, 38*b*, 40*a* and 40*b* each include respective pairs of spaced apart upper surfaces 38*c'*, 38*c''*, 40*c'* and 40*c''*, and lower surfaces 38*d'*, 38*d''*, 40*d'* and 40*d''*. In the embodiment depicted, pushers 14 and 16 comprise guide elements (not shown in the FIGS.) which comprise bearings and pins, as is well known. Pairs of upper surfaces 38*c'*, 38*c''*, 40*c'* and 40*c''* are spaced apart a suitable distance to accommodate the pusher bearings, and pairs of lower surfaces 38*d'*, 38*d''*, 40*d'* and 40*d''* are spaced apart a suitable distance and have a suitable height to accommodate pusher pin. The divert guide paths may be configured in guide block 32 as any configuration suitable to accommodate any guide element configuration which pushers 14 and 16 may have. Although in the embodiment depicted as described herein below, crossover switch 30 is actuated by and switches on the pusher pin, it will be understood that the teachings of the present invention encompass configuration for actuation by and switching on any suitable part of any guide element configuration. For example, the embodiment depicted could be configured within the teachings of the present invention, to actuate by or switch on the pusher bearing.

Crossover switch 30 includes entrance 42 and exit 44. In the embodiment depicted, at entrance 42 divert guide tracks 38*b* and 40*b* have wide entrances, generally indicated at 38*e'* and 38*e''*, respectively defined by outer portions of upper and lower surfaces 38*c'*, 38*c''*, 38*d'* and 38*d''*, and inner upper and lower surfaces 38*f'*, 38*f''*, 38*g'*, 38*g''*. The wide entrances function to funnel guide elements of pushers 14 and 16 along the proper divert guide path a or b in the event that the pushers 14 or 16 are not in position following the appropriate divert guide path. The interface between surfaces 38*f'* and 38*f''* and of 38*g'* and 38*g''* may be any suitable configuration, such as the rounded surface shown in the embodiment depicted delineated by the vertical tangent lines.

In the embodiment depicted, for divert guide paths a and b, the respective distances between the pairs of lower surfaces 38*d'* and 38*d''* are larger at the entrance end, respectively converging toward each other downstream thereof, acting as a "fine funnel" for the pusher guide pins.

Guide block 32 is carried by mounting bracket 36, secured thereto, in the embodiment depicted, by a plurality of fasteners 46 which extend from mounting bracket 36 through openings in guide block 32. Mounting bracket 36 includes openings 48 through which fasteners (not shown) may extend to connect mounting bracket 36 to sortation conveyor 2, such as through cross members 50 (FIG. 1). In the embodiment depicted, fasteners 52 connect switch assembly 34 to guide block 32. Switch assembly 34 is located relative to guide block 32 by locating pins 54 (not shown in FIG. 4, see FIG. 13B) which extend into complementary shaped and appropriately located openings 56 in guide block 32.

Figure 5:
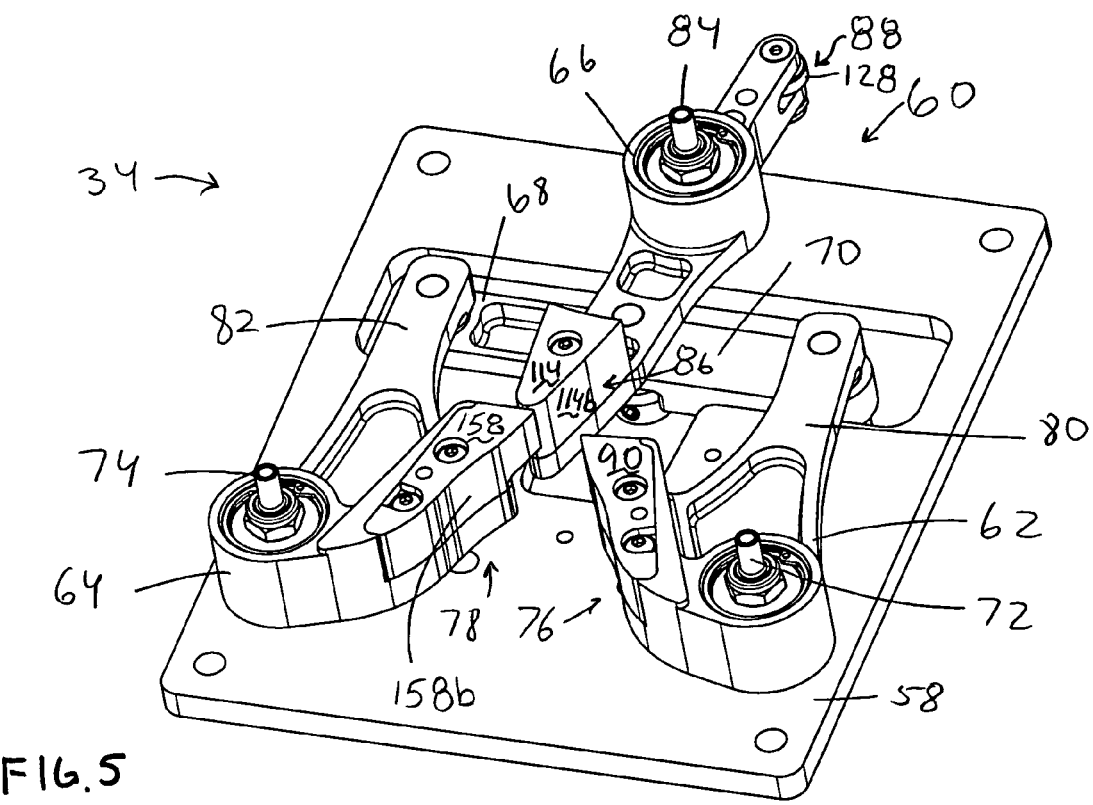
FIG. 5 is a top perspective view illustrating the dual actuator mechanism of the crossover switch of FIG. 1.
Figure 6:
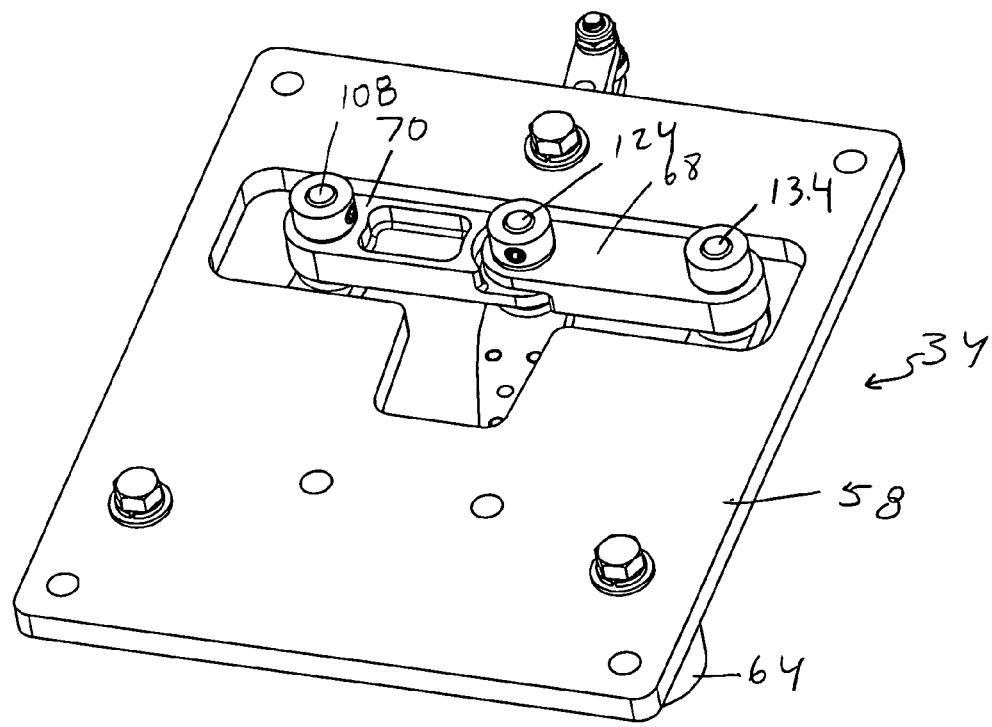
FIG. 6 is a bottom perspective view of the mechanism illustrated in FIG. 5.
Figure 7:
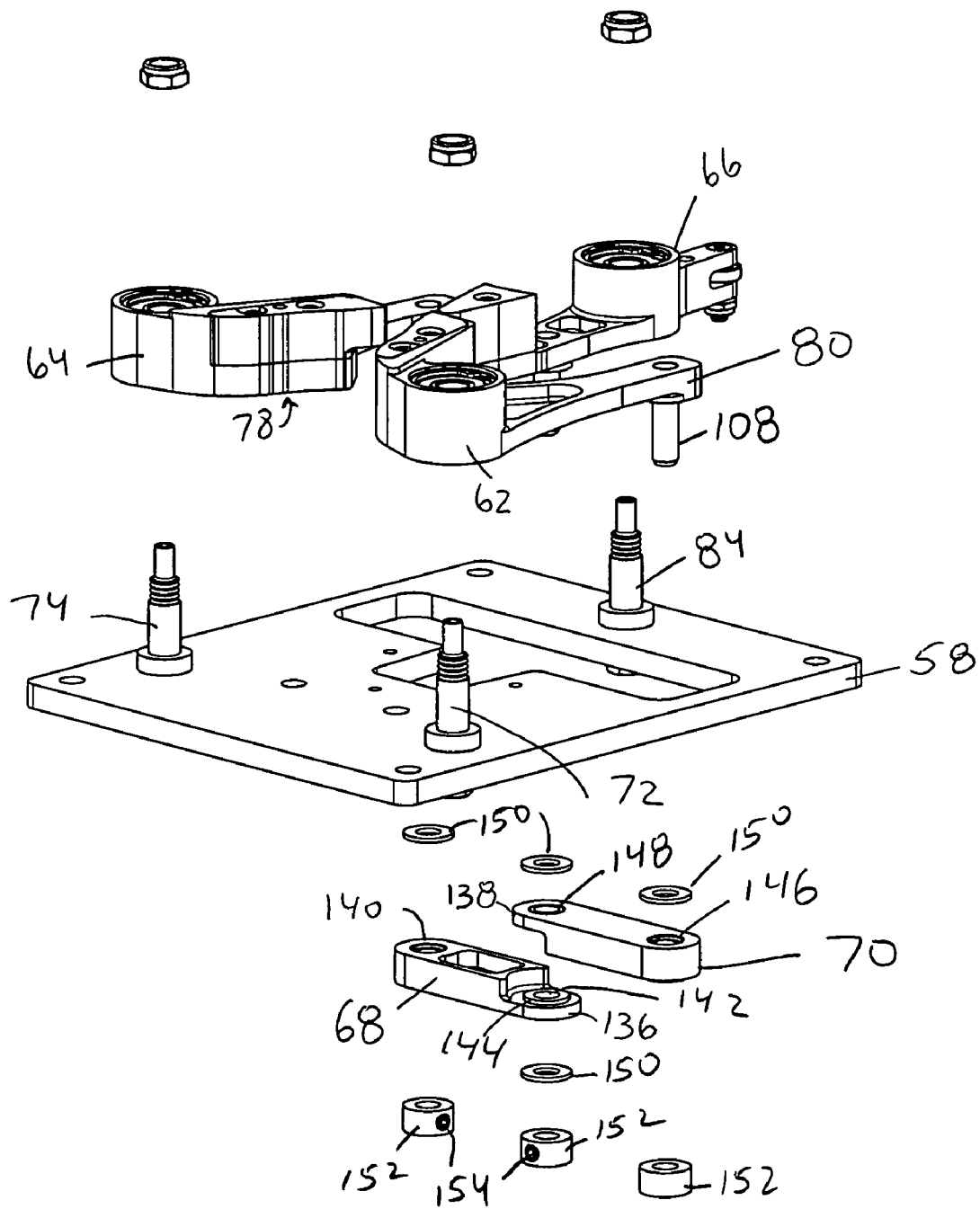
FIG. 7 is an exploded perspective view of the mechanism of FIG. 5.

Referring to FIGS. 5, 6 and 7, switch assembly 34 comprises mounting bracket 58 which carries switch mechanism, generally indicated by 60. Switch mechanism 60 comprises pivotable actuators 62 and 64, pivotable switch arm 66, and link members 68 and 70. Each actuator 62, 64 is pivotable about a respective pivot 72, 74, and includes actuation portion 76, 78 and switch drive arm portion 80, 82. Pivotable switch arm 66 is pivotable about pivot 84, and includes switch portion 86 and detent portion 88.

Figure 8:
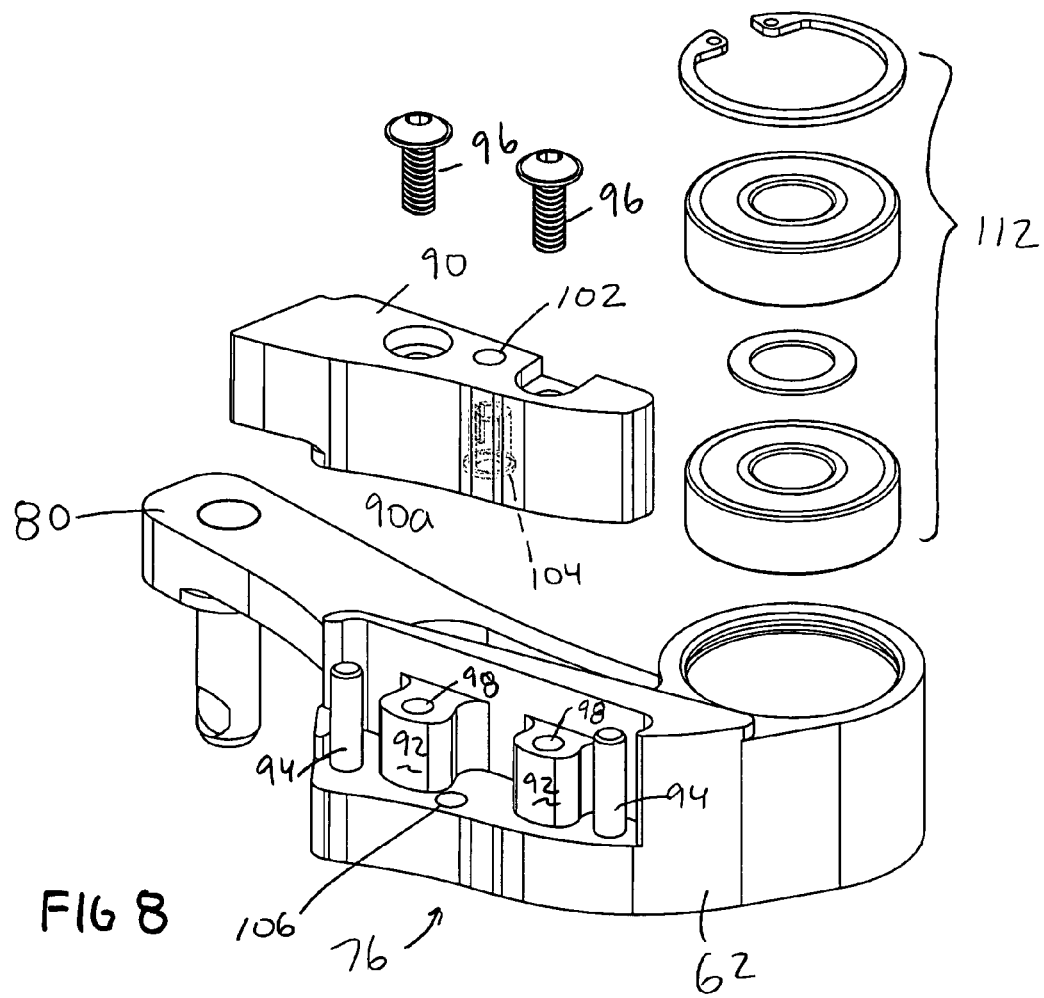
FIG. 8 is an exploded perspective view of an actuator arm of the crossover switch of FIG. 1.
Figure 9:
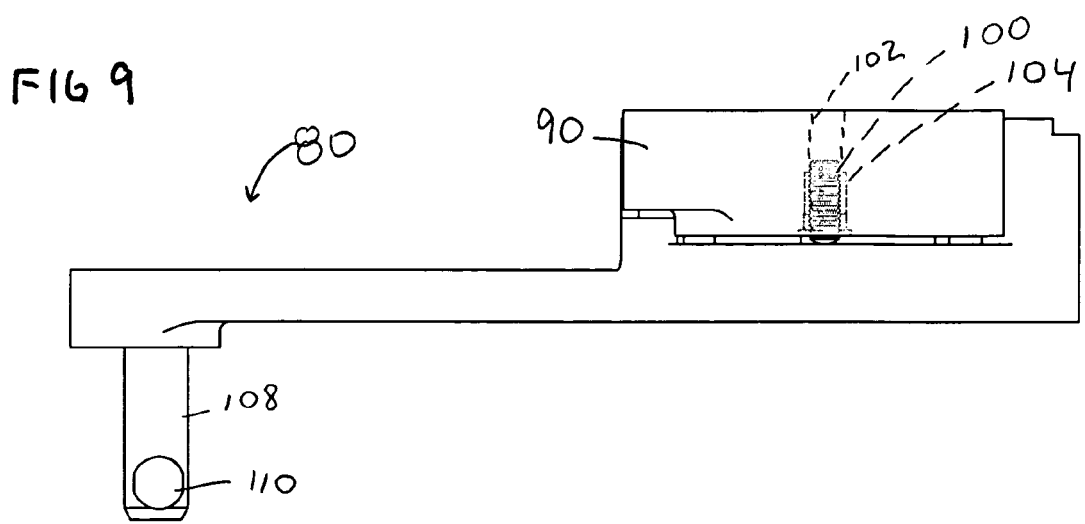
FIG. 9 is a side view of the actuator arm illustrated in FIG. 8.

Referring also to FIGS. 8 and 9, there is illustrated actuator 62. In the embodiment depicted: actuators 62 and 64 are mirror images of each other, so only actuator 62 will be described in detail, it being understood that the description of actuator 62 is applicable to actuator 64. Actuation portion 76 includes actuator insert 90 which provides a replaceable wear surface. Actuator insert 90 may be made of any suitable material, such as UHMW. Actuator 62 includes projections 92 and locating pins 94, and actuator insert 90 includes complementarily shaped openings (not seen) into which projections 92 and pins 94 extend when actuator insert 90 is mounted on actuator 62. Actuator insert 90 is press fit onto actuator 62, and secured by fasteners 96 which engage openings 98 in projections 92. Removal of actuator insert 90 may be accomplished in any suitable manner. In the embodiment depicted, threaded screw 100 is inserted into hole 102 of actuator insert 90 to engage threaded insert 104 and rotated to lift actuator insert 90 off of actuator 62, as can be seen in FIG. 9. An alternative removal construction is also provided in the embodiment depicted. A threaded screw may be inserted into threaded hole 106 on the side of actuator 62 opposite actuator insert 90 to push actuator insert 90 off of actuator 62.

In the embodiment depicted, switch drive arm portion 80 includes downwardly depending pivot 108 with flat 110 at its distal end. Pivot 108 is spaced from the pivot axis (not numbered) of actuator 62 that coincides with actuator pivot 72, providing a lever arm as switch drive arm portion 80 rotates about actuator pivot 72 thereby providing amplification of the motion of actuation portion 76 about actuator pivot 72. As will be described below, switch drive arm portion 80 also translates the movement of actuation portion 76 resulting from contact with the pusher guide element into movement of switch portion 86 in conjunction with link member 70. As will be appreciated, other constructions configured to translate the motion of the actuation portion 76 to movement of switch portion is within teachings of the present invention.

Actuator 62 includes bearing assembly 112 which provides for pivotable movement about actuator pivot 72.

Figure 10:
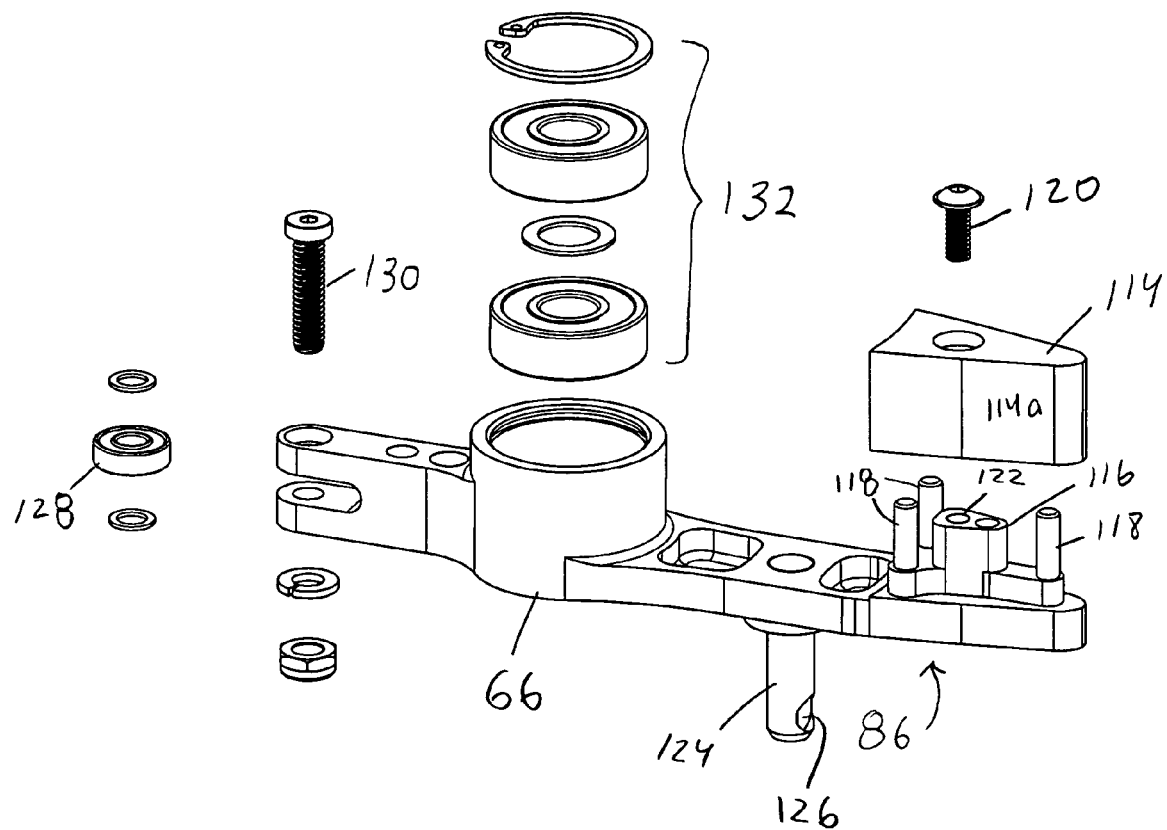
FIG. 10 is an exploded perspective view of the toggle arm assembly of the crossover switch of FIG. 1.

Referring to FIG. 10, switch arm 66 is illustrated. Switch portion 86 includes switch insert 114 which provides a replaceable wear surface. Switch insert 114 may be made of any suitable material, such as UHMW. Switch arm 66 includes projection 116 and pins 118, and switch insert 114 includes complementarily shaped openings (not seen) into which projection 116 and pins 118 extend when switch insert 114 is mounted on switch arm 66. Switch insert 114 is press fit onto switch arm 66, and secured by fastener 120 which engages opening 120 in projection 116. Removal of switch insert 114 may be accomplished in any suitable manner. In the embodiment depicted, a threaded screw may be inserted into threaded hole 124 on the side of switch arm 66 opposite switch insert 114 to push switch insert 114 off of switch arm 66. In the embodiment depicted, the set screw used to remove actuator insert 90 or switch insert 114 was a 10-32 oval point set screw, and can be stored in hole 38h (see FIG. 11) for convenience.

In the embodiment depicted, switch drive arm portion 80 includes downwardly depending pivot 124 with flat 126 at its distal end. Pivot 124 is spaced from the pivot axis (not numbered) of switch arm 66 that coincides with pivot 84. Motion of pivot 124 about pivot 84 is amplified at switch insert 114 by the lever arm.

In the embodiment depicted, detent portion 88 extends extending in the direction opposite of switch portion 86, and includes bearing 128 rotatably secured to detent portion 88 by fastener 130. The functioning of bearing 124 is described below.

Switch arm 62 includes bearing assembly 128 which provides for pivotable movement about pivot 84.

Referring to FIGS. 5-7, pivot 108 is connected to pivot 124 by link member 70, and pivot 134 of actuator 64 is connected to pivot 124 by link member 68. In the embodiment depicted, link members 68 and 70 are nearly identical to each other, as can be seen in FIG. 7. One end of each member 68, 70 includes offset portion 136, 138. Offsets 136, 138 permit members 68 and 70 to overlap each other as seen in FIG. 7.

Referring to member 68, bronze bushings 140 and 142 are disposed in openings. The inner diameter of bronze bushings 140, 142 are complementary to pivot 134 and 124, respectively. Bushing 142 is a flanged pushing, having integral bronze flange 144 at offset 136. Bushing 140 also has an integral washer, which is not visible. Member 70 similarly has bronze bushings 146 and 148 with respective integral washers which are not visible. Additional bronze washers 150 provide bearing surfaces to reduce rotational friction with the adjacent part. In the embodiment depicted, bushings 140, 142 (including integral flange 144), 146 and 148, and washers 150 are made of SAE 841 bronze. Link members 68 and 70 are retained to pivots 108, 124 and 134 through set collars with cone point set screws which engage flats (e.g., 110, 124) on pivots 108, 124 and 134. Any suitable material and configuration of bushings and link members, and retention may be used.

Referring to FIGS. 5 and 6, actuator 64 is illustrated as rotated in counter clockwise direction, such that when switch assembly 34 is mounted to guide block 32, actuator insert 158 does not extend into divert guide path b, and is aligned with switch insert 114, as is shown in FIG. 2. In this orientation, actuator insert 90 extends into divert guide path a, as also shown in FIG. 2. As discussed below, guide elements of pushers 14 diverted at divert location 26 travel along divert guide path b, with, in crossover switch 30, the pusher pins extending between the pair of lower surfaces 38d' and the bearings disposed between the pair of upper surfaces 38c'. With actuator in the position illustrated in FIGS. 2 and 5, the pin will travel along actuator insert 158 and surface 114b of switch insert 114, which blocks the potion of divert guide path a downstream of switch insert 114, so that the pin continues to travel along divert guide path b across the intersection of divert guide paths a and b.

Upon diverting of pushers 16 at divert location 26, guide elements of pushers 16 travel along divert guide path a, with, in crossover switch 30, the pusher pins extending between the pair of lower surfaces 38d'' and the bearings disposed between the pair of upper surfaces 38c''. The pin of the leading pusher of a group of pusher 116 so diverted, engages actuator insert 90, causing actuator 62 to rotate clockwise as actuator insert 90 is pushed out of divert guide path a. This motion of actuator 62 causes switch drive arm 80 to move link member 70 to the right (in FIG. 5), causing switch arm 66 to pivot, moving switch insert 114 to the right, blocking divert guide path b sufficiently prior to the pin of pusher 116 reaches the end of actuator insert 80 so that the pin travels along surface 114a after leaving actuator insert 90, so that the pin continues to travel along divert guide path a across the intersection of divert guide paths a and b. This movement of actuator 62 causes link member 68 to rotate actuator 64 clockwise, moving actuator 158 into divert guide path b, ready to be engaged and triggered by the next pusher 114 which is selectively diverted at divert location 26 along divert guide path b.

Any suitable different configuration may be implemented within teachings of the present invention which provide the as switching described herein. For example, in the embodiment depicted, link members 68 and 70 are two piece due to the kinematics of pivots 108, 124 and 134. Resiliency within these linkages may allow a solid, flexible or not, link to be used to connect pivots 108, 124 and 134. Lost motion connections might be used, such as possibly in combination with mechanisms to locate the actuator of the inactive divert guide path to be disposed in an actuation, or triggering, position. Configurations other than the lever arm design of switch drive arm portion 80 may also be used to effect movement of switch insert 114 to a blocking or gate position at the inactive divert guide path.

Referring to FIG. 3, dampers 156 and 160 are disposed adjacent link members 68 and 70 to absorb energy from switch mechanism 60 by, in the embodiment depicted, engaging set collars 152 on pivots 198 and 134. The positions of dampers 158 and 160 may be adjusted through the thread and locking nut configuration shown. Any suitable energy absorbing configuration may be used which reduces noise. in the embodiment depicted, dampers 158 and 160 are viscous variable orifice shock absorbers, such as MC150 made by ACE, with urethane ends disposed to engage set collars 152.

Figure 13A:
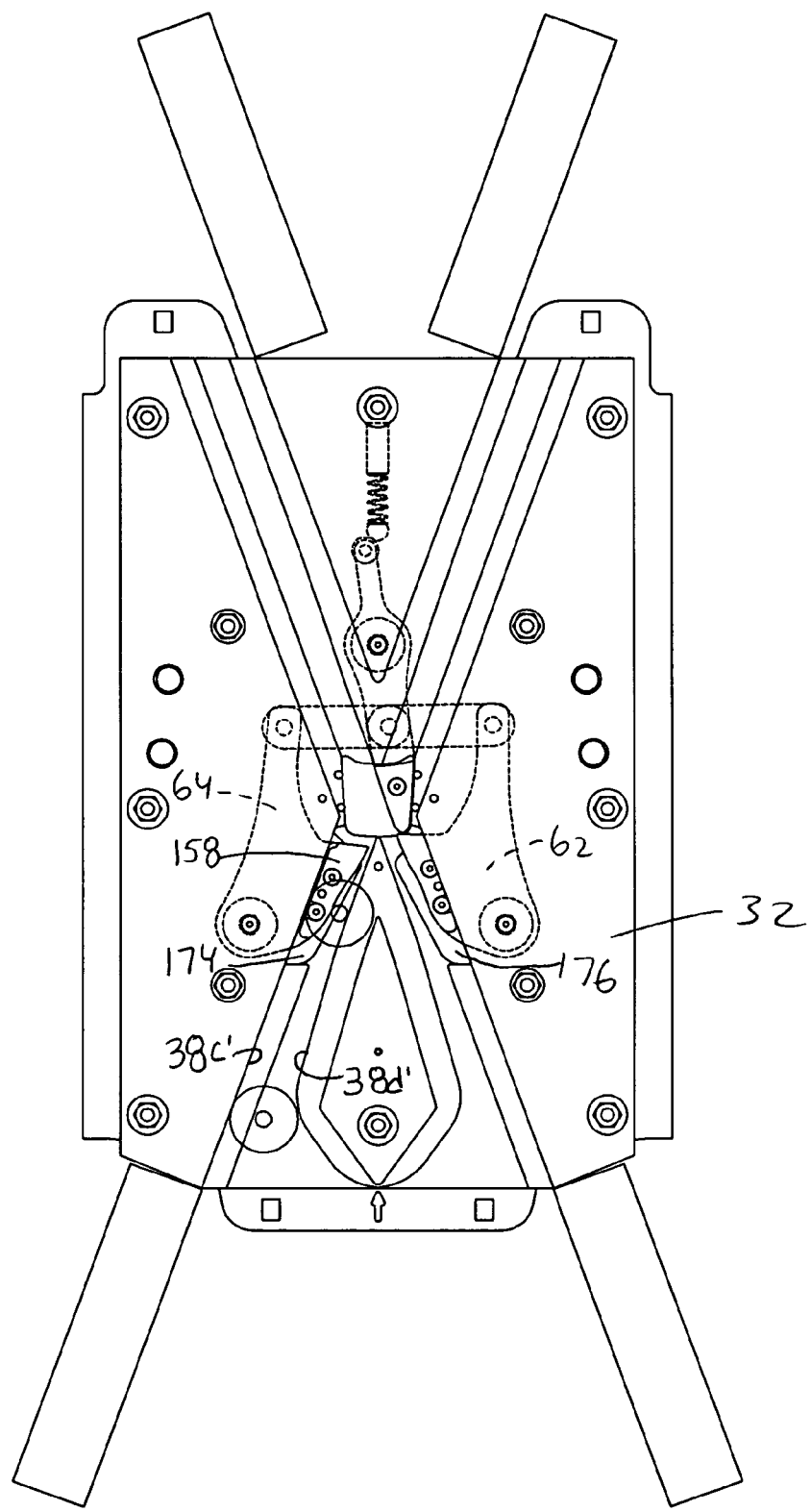
Figure 13B:
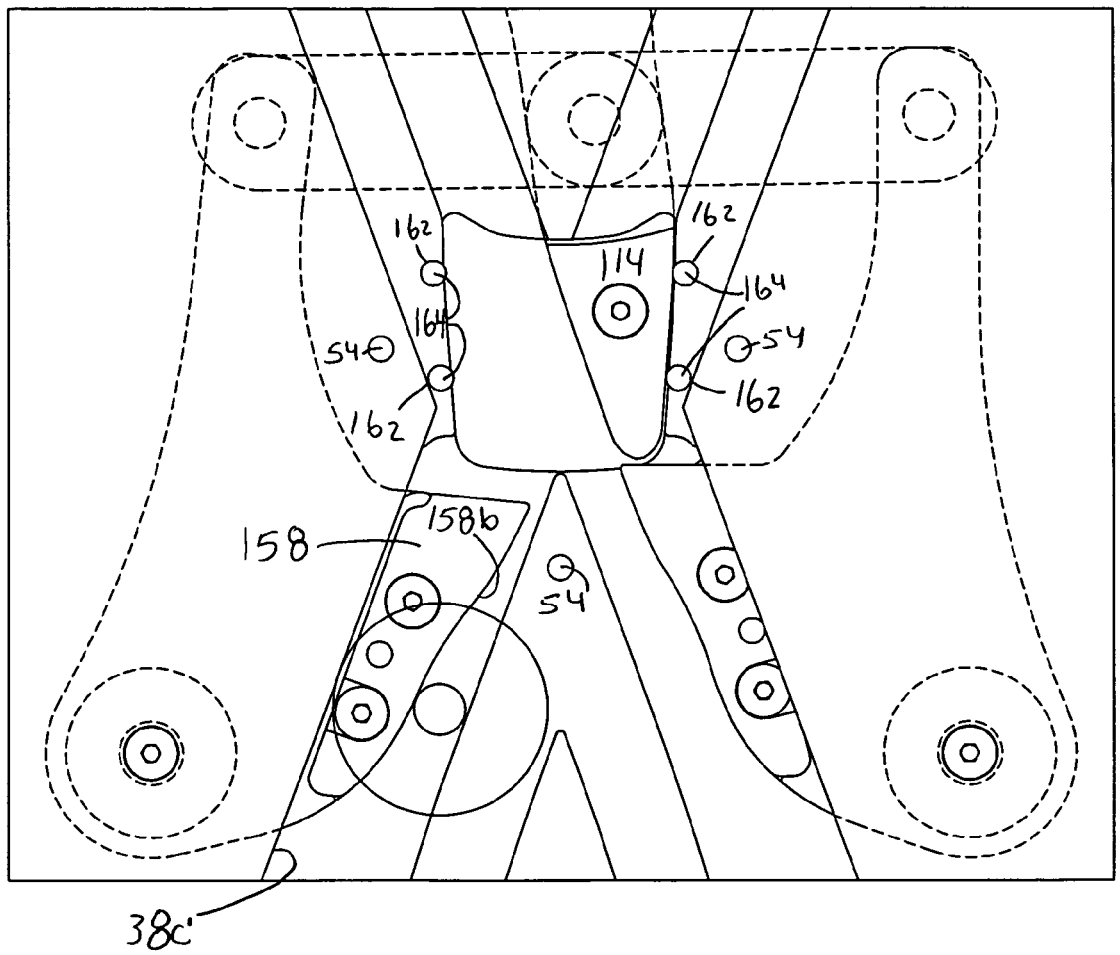

Referring to FIG. 13B, additional dampening is shown incorporated in the embodiment depicted. Guide block 32 includes blind holes 162 in the outer lower surfaces 40d' and 40d'' adjacent the limits of travel of switch insert 114. Blind holes 162 open into outer lower surfaces 40d' and 40d'' along their length. Disposed within each hole, with a slip to slight press, are cylindrical urethane members 164, such as a segment of a urethane round belt having an 83 durometer, the diameter of which results in members 164 extending out through the opening between blind holes 162 and surfaces 40d' and 40d'', in the embodiment depicted by about 0.020 inches forming dampers, also referred to as bumpers, which absorb energy as surfaces 114a or 114b rotate into engagement with these extending portions of members 164, reducing noise. Switch insert 114 is supported by these bumpers as pusher pins travel there across so that the loading from the sliding force, line contact between the pusher pin and switch insert 114 is not through switch arm 66.

Referring to FIG. 3, bearing 128 engages ball 166, which is urged into contact by spring 168. Ball 166 and spring 168 are disposed in a hole in guide block 32 and, in the embodiment depicted, retained at one end by bolt. Ball 166 is prevented from leaving the hole by the range of travel of bearing 128 on detent portion 88. As described below, this configuration initially resists rotation of switch arm 66 caused by triggering of an actuator, and then once past dead center, assists rotation.

Figure 11:
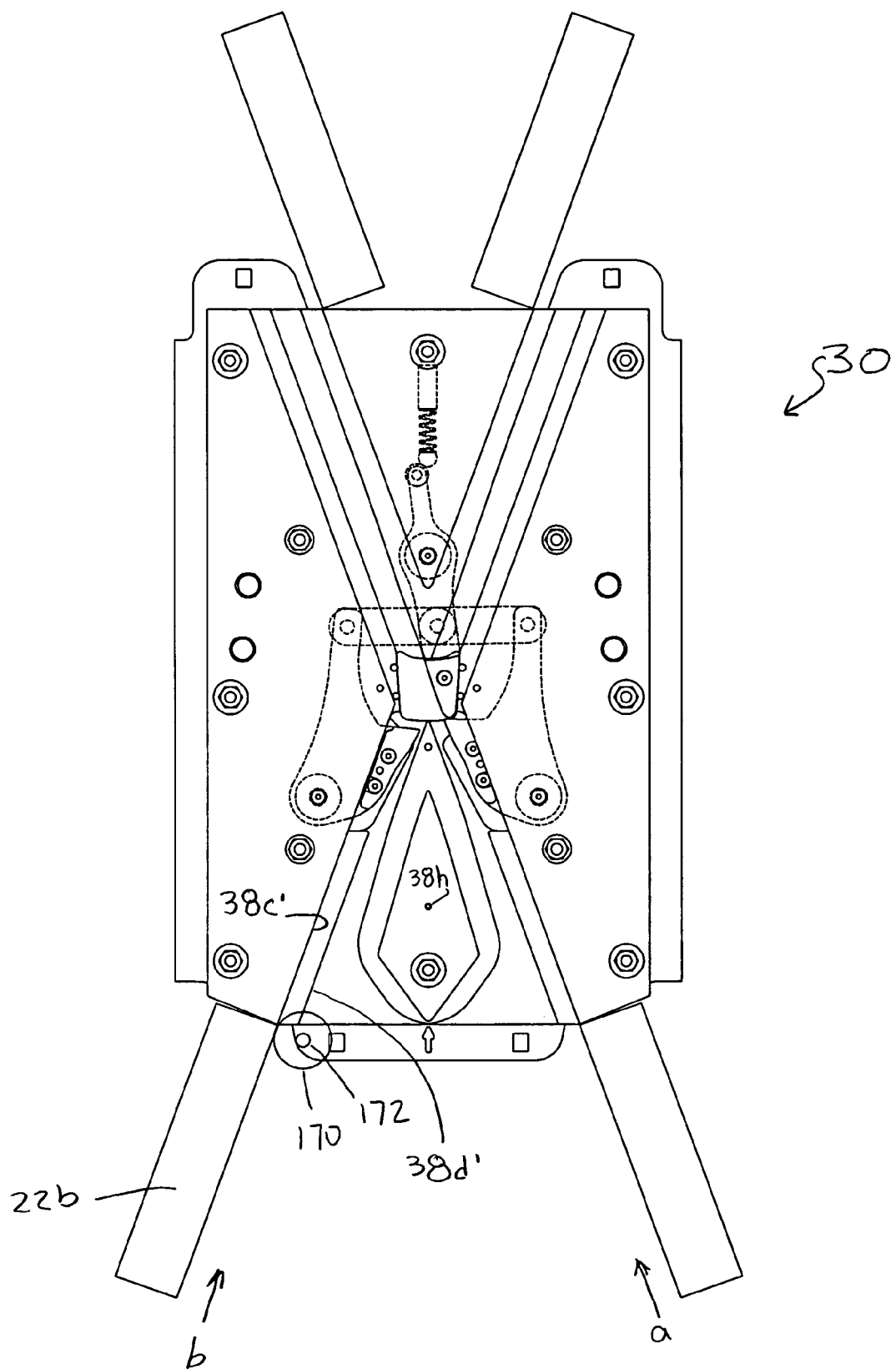
FIGS. 11-19 are top views of the crossover switch of FIG. 1 illustrating the progression of a guide element of a pusher traveling through the crossover switch of FIG. 1.

Referring to FIGS. 11-19, there is illustrated the progression of a guide element of one of pushers 14 traveling along divert guide path b through crossover switch 30. FIG. 11 illustrates the guide element as bearing 170 and pin 172, diagrammatically appearing as two concentric circles. For simplicity, numerals for bearing 170 and pin 172 will be omitted in FIGS. 12-19. As shown in FIG. 11, the guide element is about to enter crossover switch 30 with the bearing being guided by divert guide track 22b. The bearing as shown in FIG. 11 will transition onto upper surface 38c', and the pusher load will remain on the bearing against upper surface 38c' until the pin engages switch insert 114 as described below. The pin will not engage either lower surface 38d'.

Figure 12:
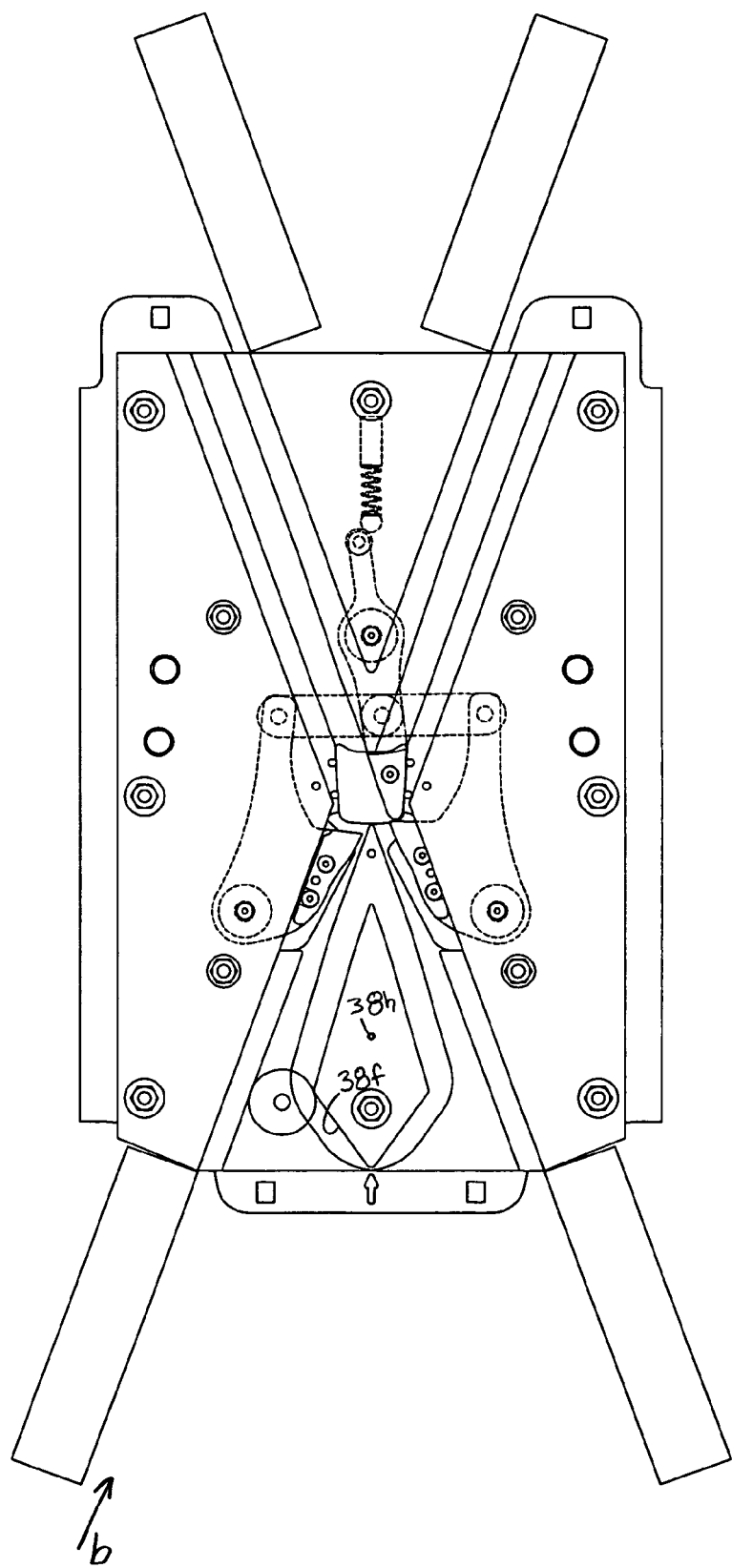

FIG. 12 illustrates a bearing which has entered crossover switch 30 and is out of place. The wide entrance is illustrated funneling the pusher and concomitantly the bearing and pin into the proper position. Surface 38f has engaged and funneled the bearing in the appropriate direction to move along divert guide path b.

FIG. 13A illustrates the bearing and the pin in two different positions, an upstream position and a downstream position. FIG. 13B is an enlarged fragmentary view of the downstream position of the bearing and pin, at which the pin has made initial contact with surface actuator insert 158. As shown, the bearing travels along upper surface 38c' between the two positions. Within this zone, the space between the outer and inner lower surfaces 38d' decreases, with the inner lower surface 38d' closing the distance. In the embodiment depicted, the angle of the inner lower surface 38d' was 16° for a 20° final divert angle. In FIG. 13A, recesses 174 and 176 in guide block 32 are visible. Recesses 174 and 176 provide clearance for the portions of actuators 62 and 64 underlying actuator inserts 90 and 158. For clarity, recesses 174 and 176 are not always shown in the FIGS.

As seen in FIG. 13B, the pin has made initial contact with actuator insert 158. At this location, the remains on upper surface 38c'. In the embodiment depicted, The clearance between the pin and the pair of lower surfaces 38c' immediately before the pin contacts actuator insert 158 is engaged. For the depicted embodiment, this was as close to zero clearance as practicable from a manufacturing perspective without binding. Various things, such as perpendicularity, may result in binding if the clearance is smaller.

Figure 20:
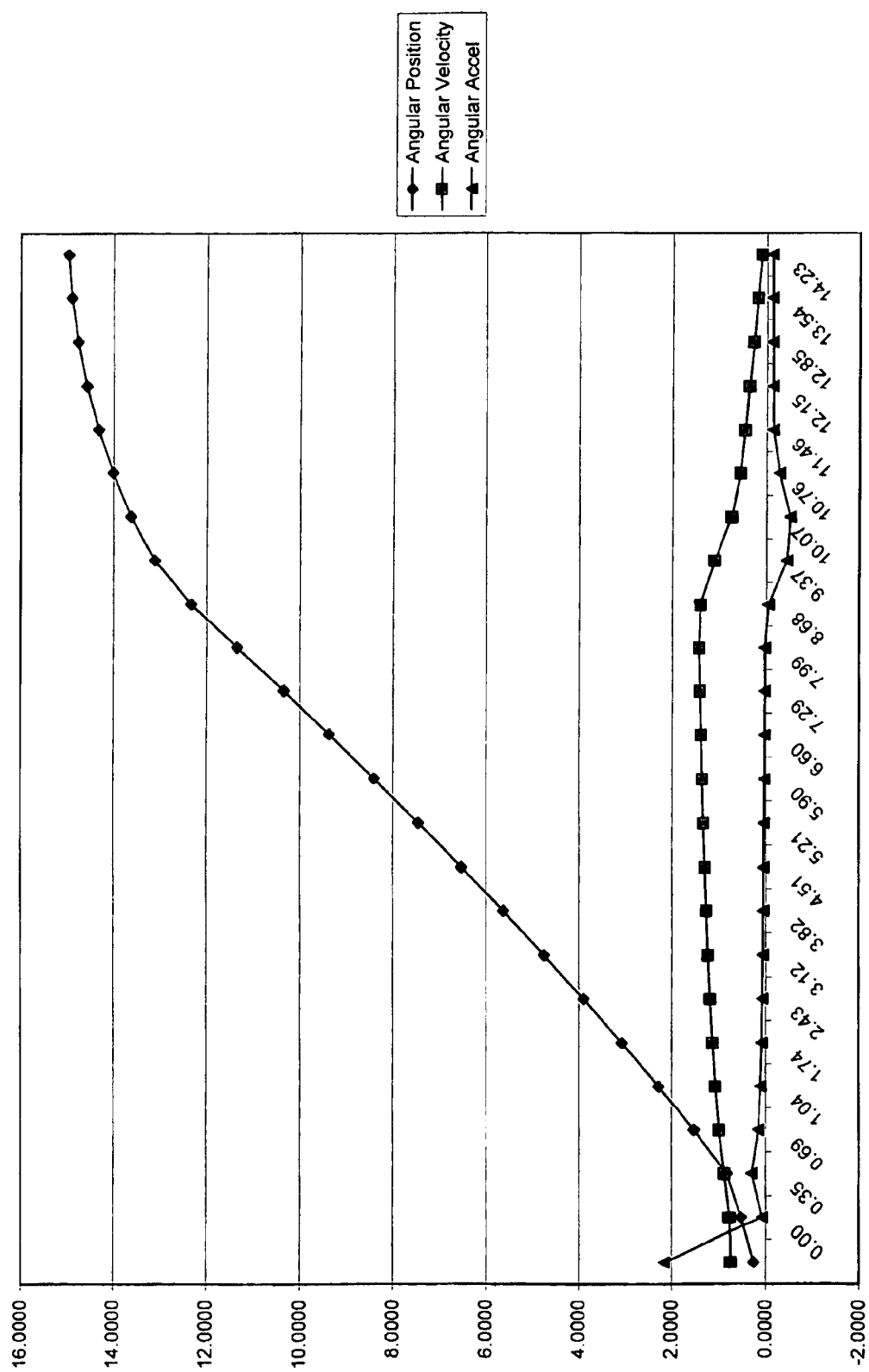
FIG. 20 is a chart illustrating an estimated position, velocity and acceleration profile for the embodiment depicted.

Although many configurations are possible, in the embodiment depicted, surface 158b of actuator insert 158 is configured to provide as relatively slow and gradual acceleration of switch mechanism 60 as possible. Surface 158b is configured to produce, as the pin advances in contact with surface 158b, as linear an angular position profile as possible, as constant an angular velocity as profile and as low an angular acceleration as possible. FIG. 20 illustrates an estimated position, velocity and acceleration profile for the embodiment depicted. In the embodiment depicted, the relative angle of initial engagement between surface 158b and the pin (relative to the pin traveling at a 20° angle) is between 3.5° and 4°. As the pin reaches and progresses past initial contact, inertia of the connected components of switch mechanism 60 is overcome by the force from the pin and the force from ball 166 and spring 168, with rotation of actuator 64 counter clockwise initiated, the ball 166 and spring 168 assembly resists the motion.

Figure 14A:
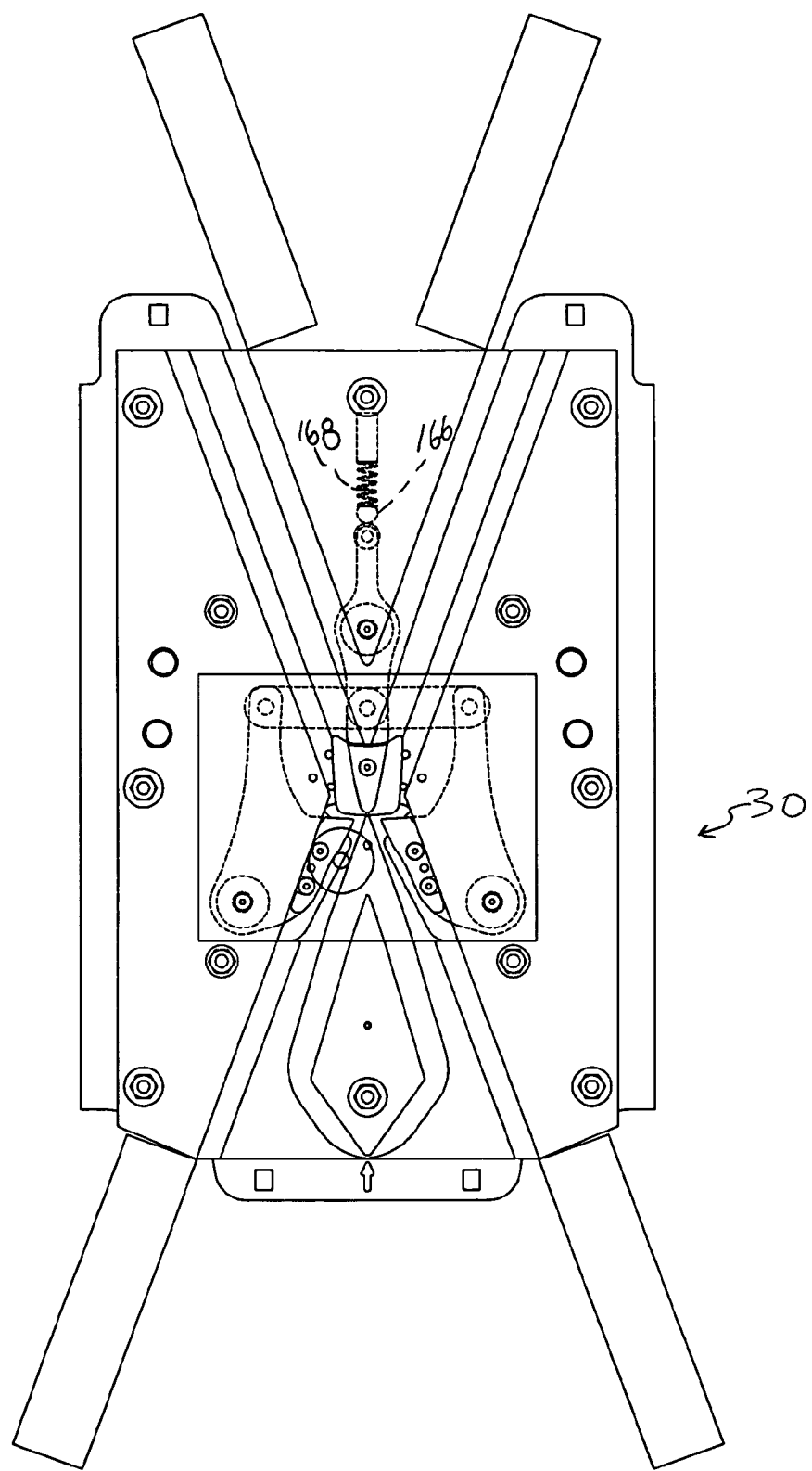
Figure 14B:
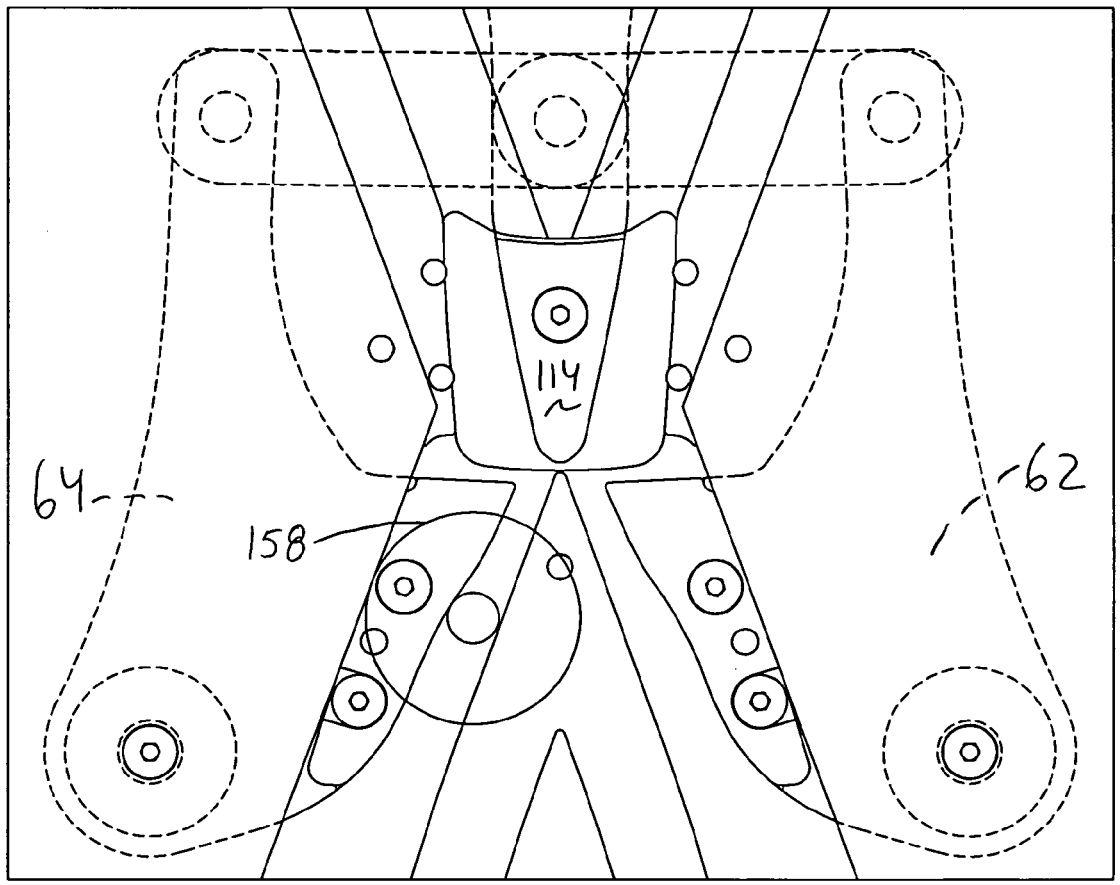

Referring to FIGS. 14A and 14B, the bearing and pin are illustrated with switch insert 114 at the mid point of its movement from the position at which it blocks divert guide path b to the position at which it blocks divert guide path a. The bearing is still guided and supported by surface 38c'. The detent assembly is at dead center, and as the pin advances from the position illustrated, spring 168 and ball 166 add force to the rotation of actuator 64. In the embodiment depicted, this force is not enough to pull the pin out of contact with actuator insert 158.

Figure 15A:
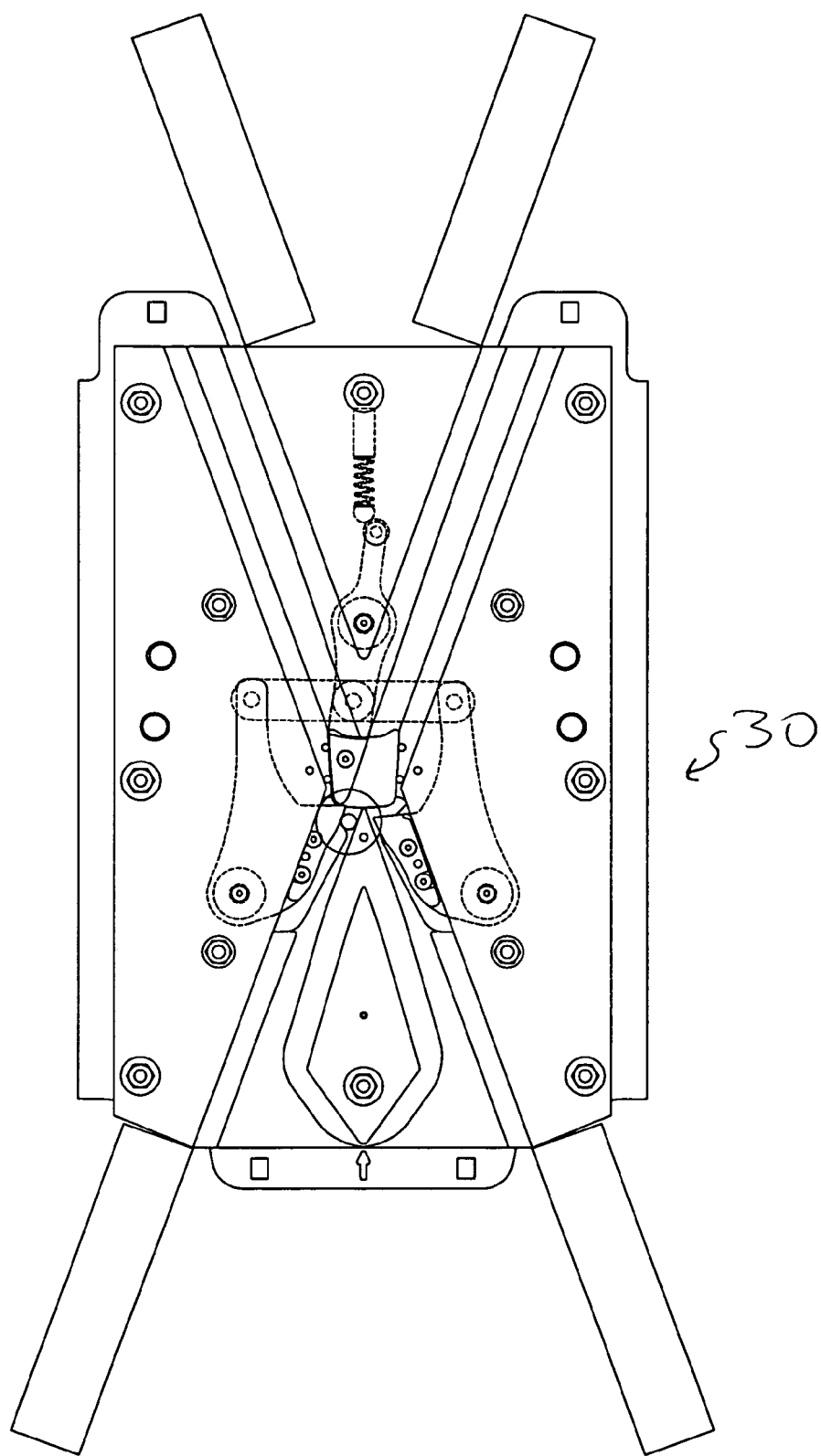
Figure 15B:
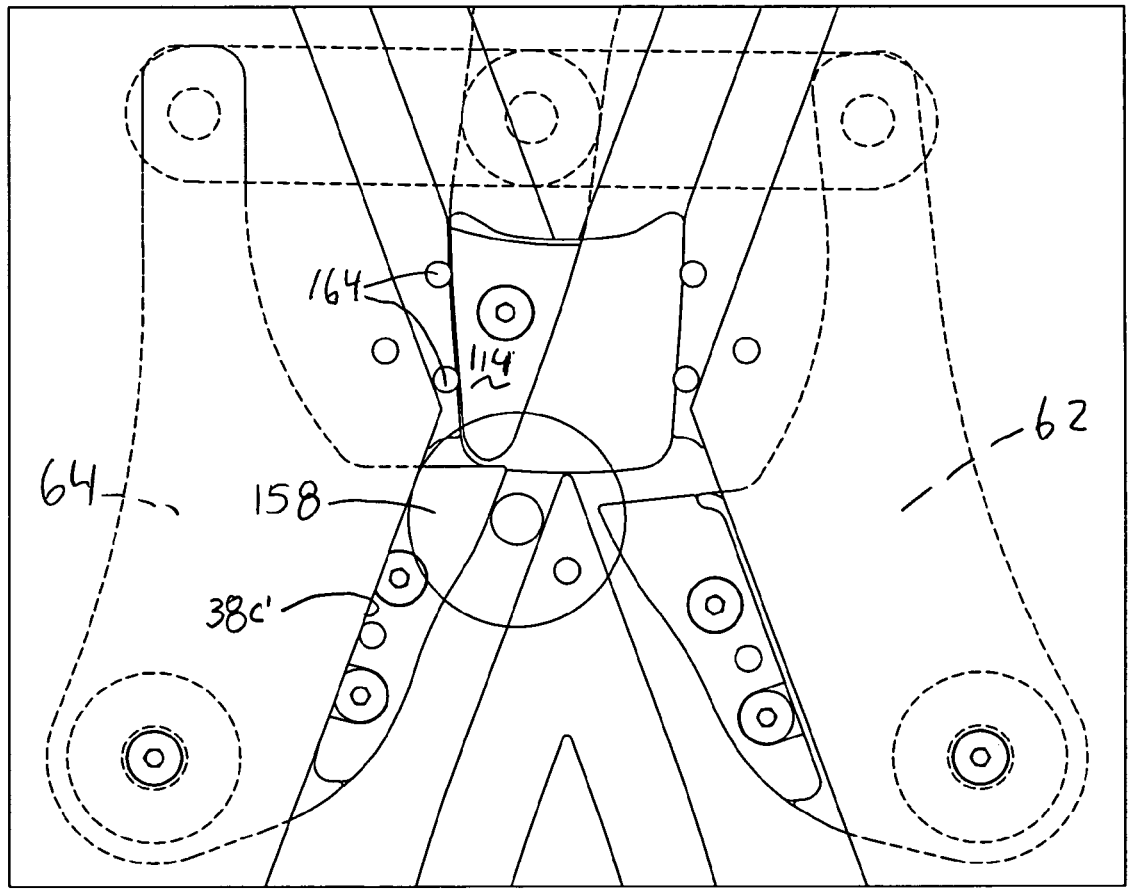

Referring to FIGS. 15A and 15B, the motion of switch mechanism 60 is complete, with actuator 64 in its full rotated position, and surface 158b of actuator insert 158 providing sufficient clearance for the pin to pass through divert guide path b, although there is likely contact between the pin and surface 158b. Actuator insert 90 is in a position within divert guide path a, to be actuated or triggered by the next guide element to travel divert guide path a. Switch insert 114 is in the required position, although there is a reaction force as switch insert contacts bumpers 164 and guide block 32. The bearing is still guided and supported by surface 38c'.

Figure 16A:
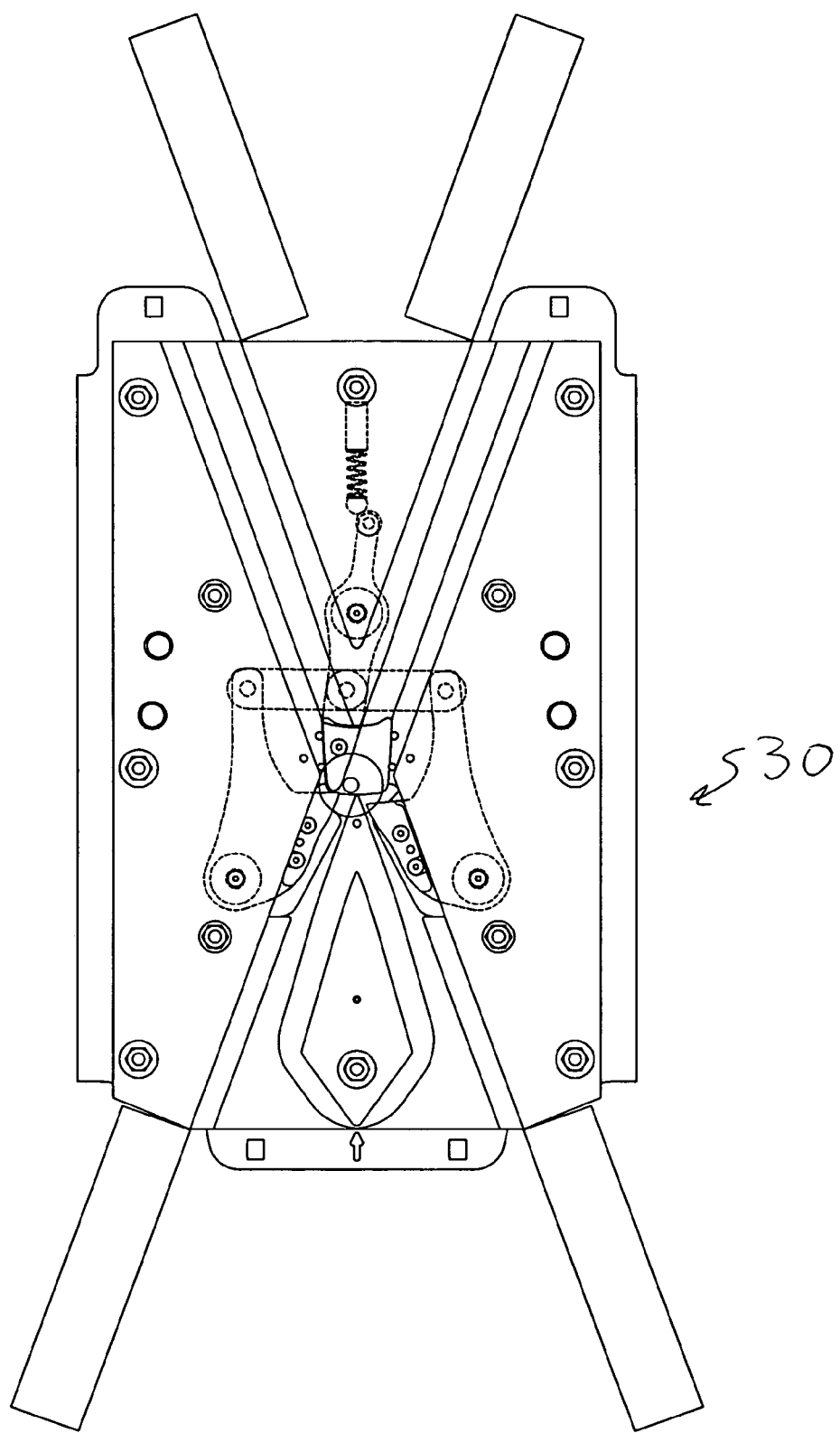
Figure 16B:
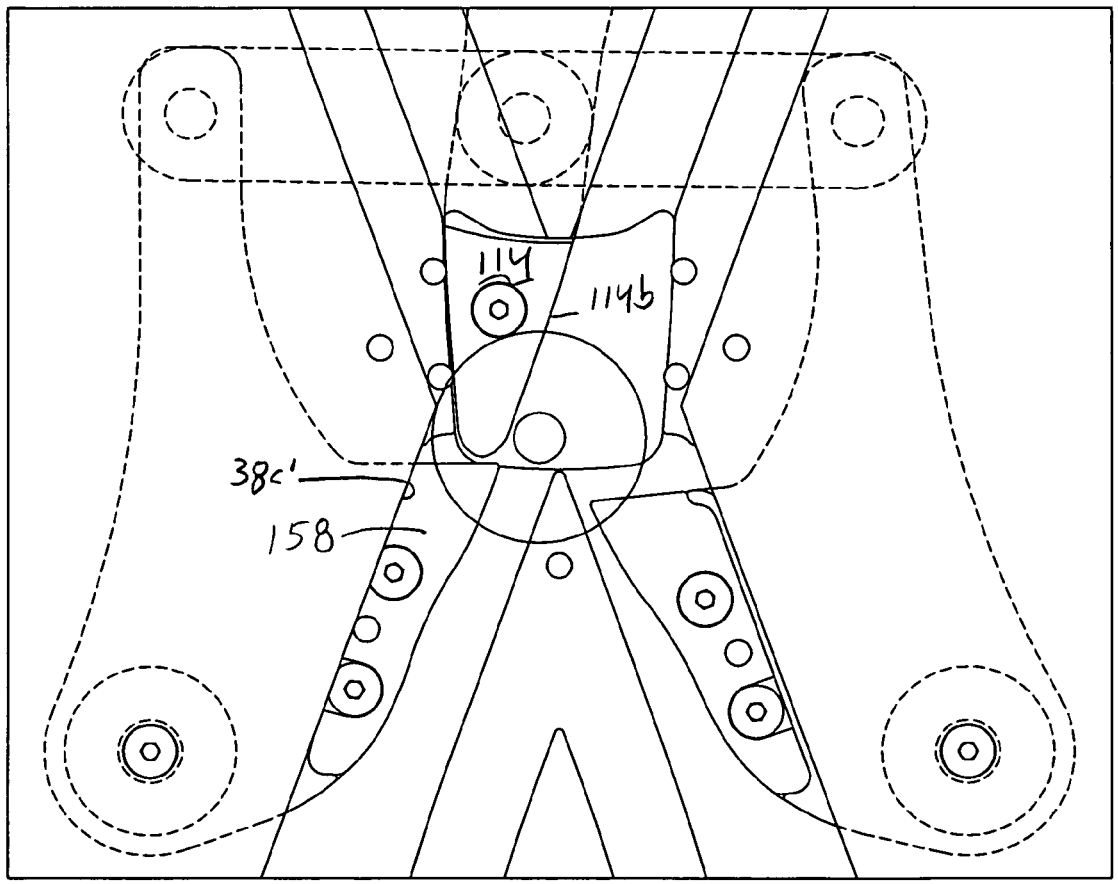
Figure 17A:
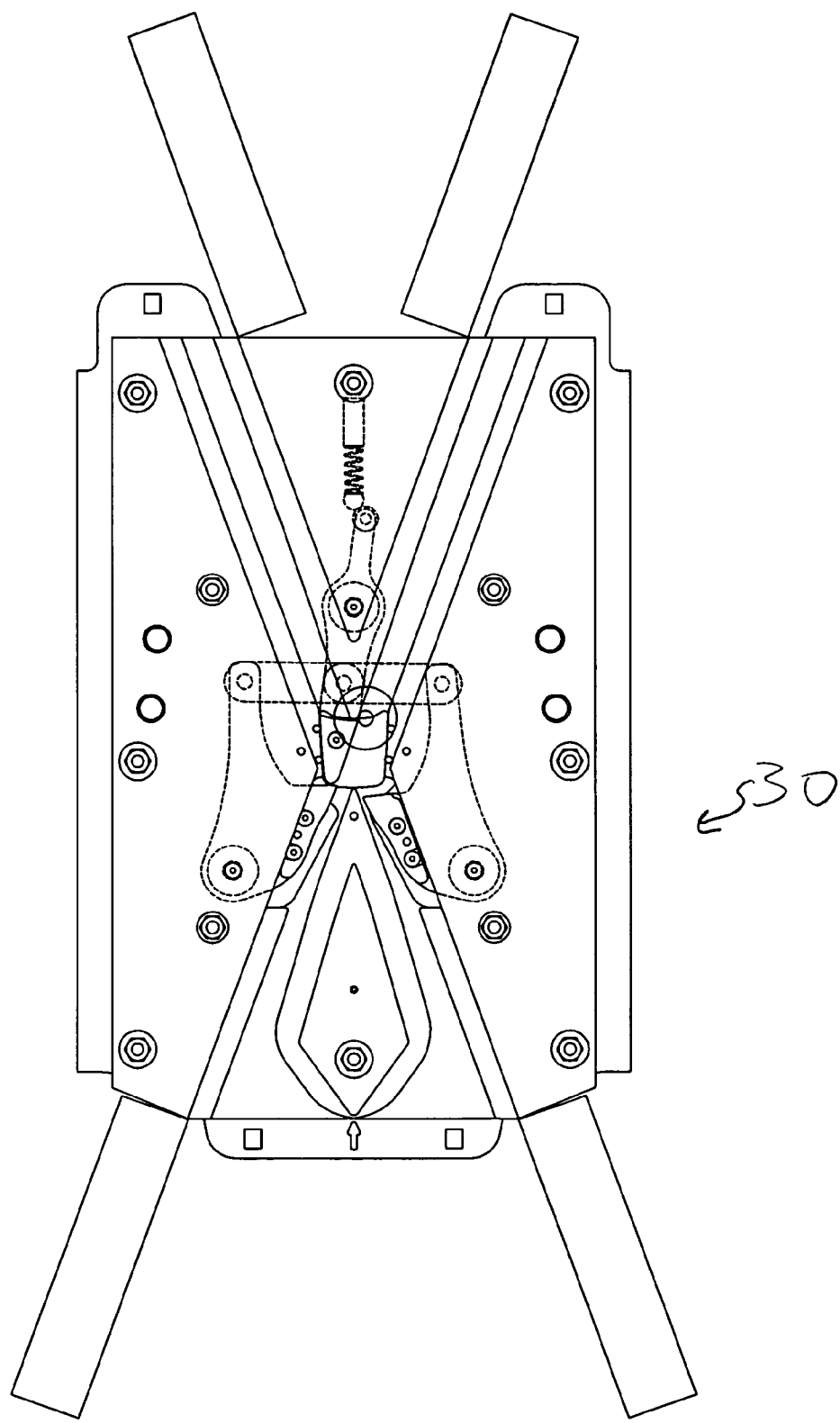
Figure 17B:
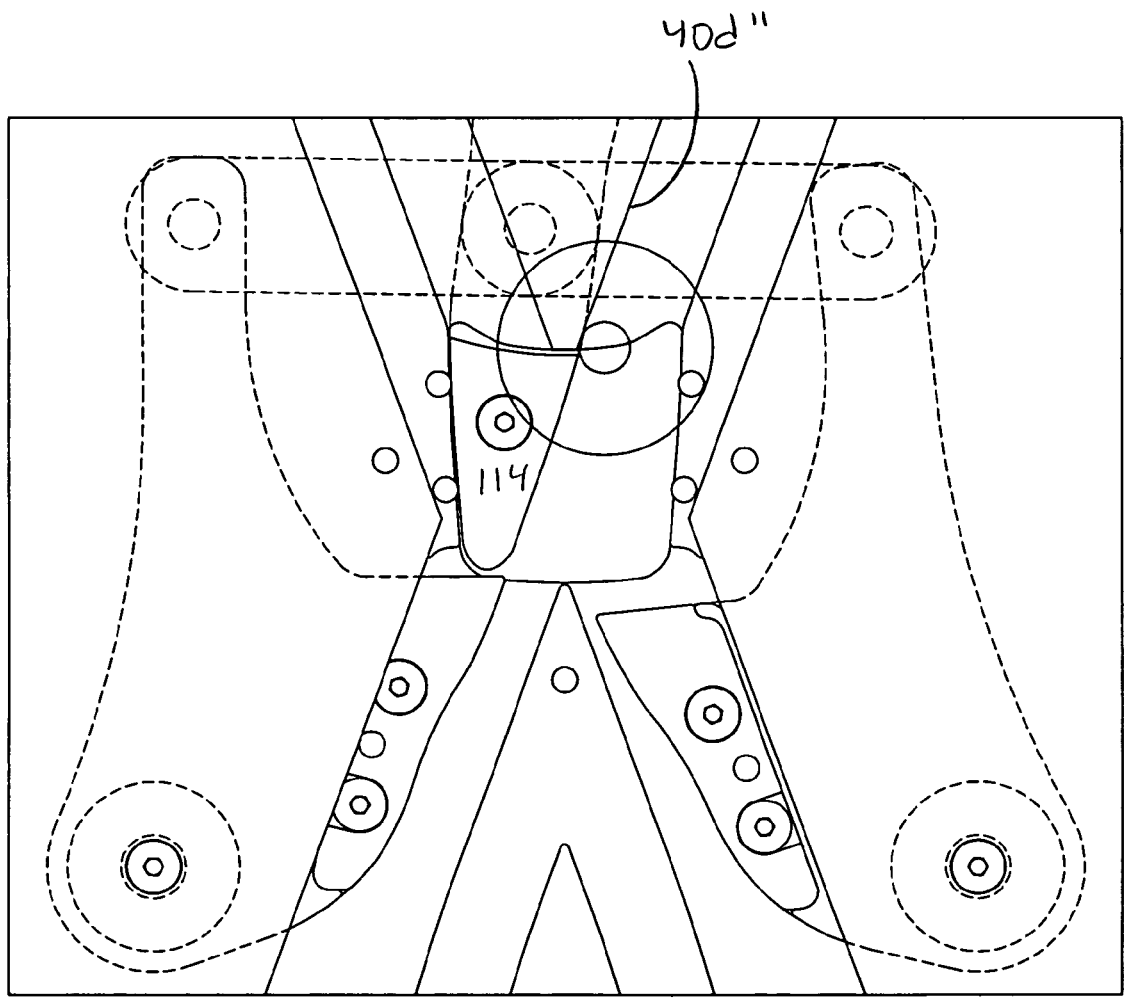

Referring to FIGS. 16A and 16B, the bearing and pin have progressed past actuator insert 158. The bearing is at its last point of contact with surface 38c'. As soon as the bearing loses contact with surface 38c', the pin will "fall" to surface 114b. In the embodiment depicted, there is a 0.020 to 0.030 inch offset, or "waterfall" from the point at which the bearing loses contact with surface 38c' and the pin contacts surface 114b. There is some resilient bias on the pusher which urges the pin immediately toward surface 114b. The angle of surface 114b is about 19° for the 20° shown. The lower angle reduces lateral acceleration, dropping the force and decreasing the load on switch insert 114. It could of course be set at 20°. About halfway downstream on surface 114b, in the embodiment depicted, surface 114b transitions from straight to a curve surface of 11.4 inches. The curve could be the entire length, or the entire length could be straight. The curve assists with the "waterfall" to the inner surface 40d", as seen in FIGS. 17A and 17B, where the pin is transitioning from switch insert 114 to the inner surface 40d".

Figure 18:
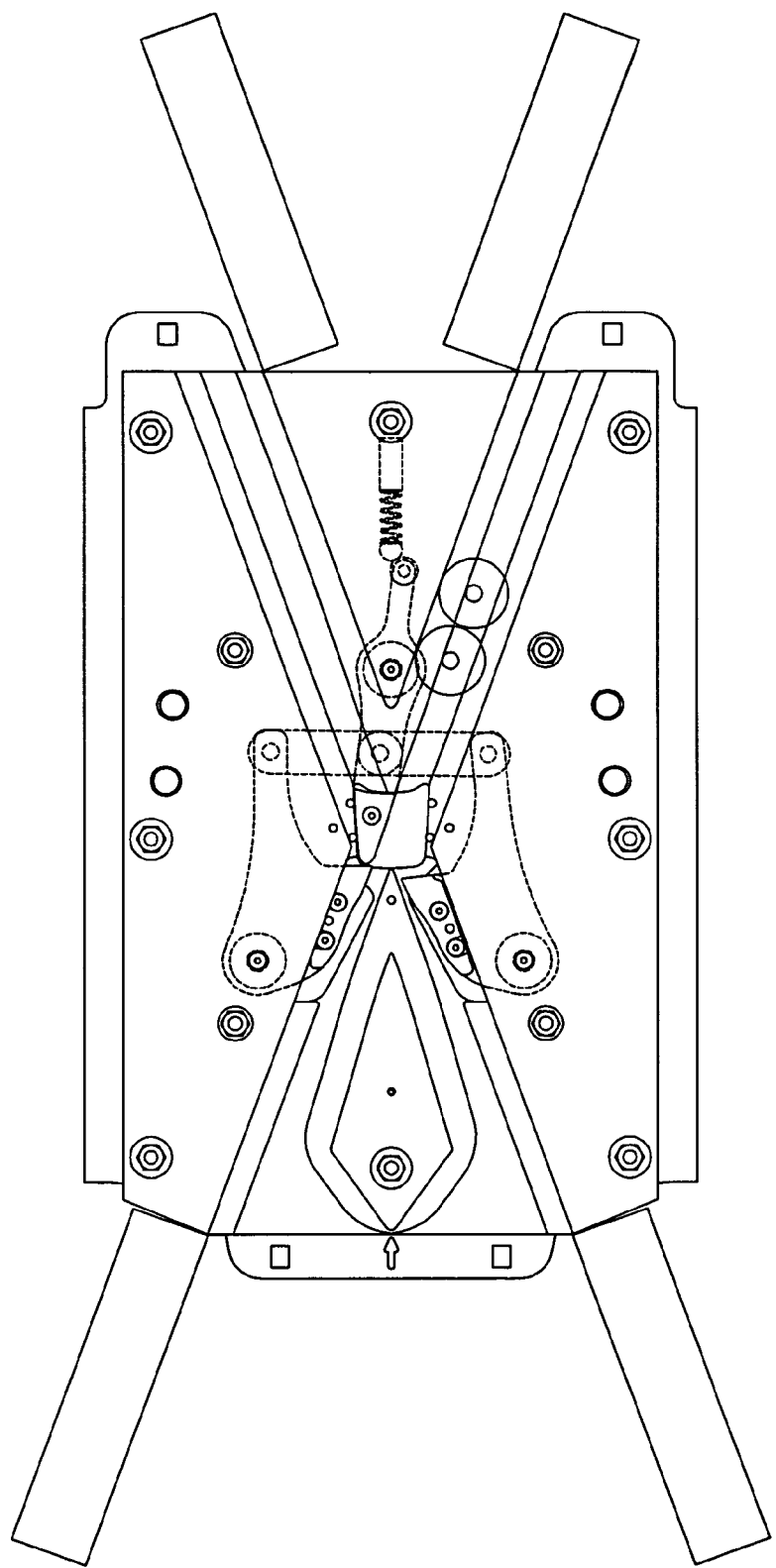
Figure 19:
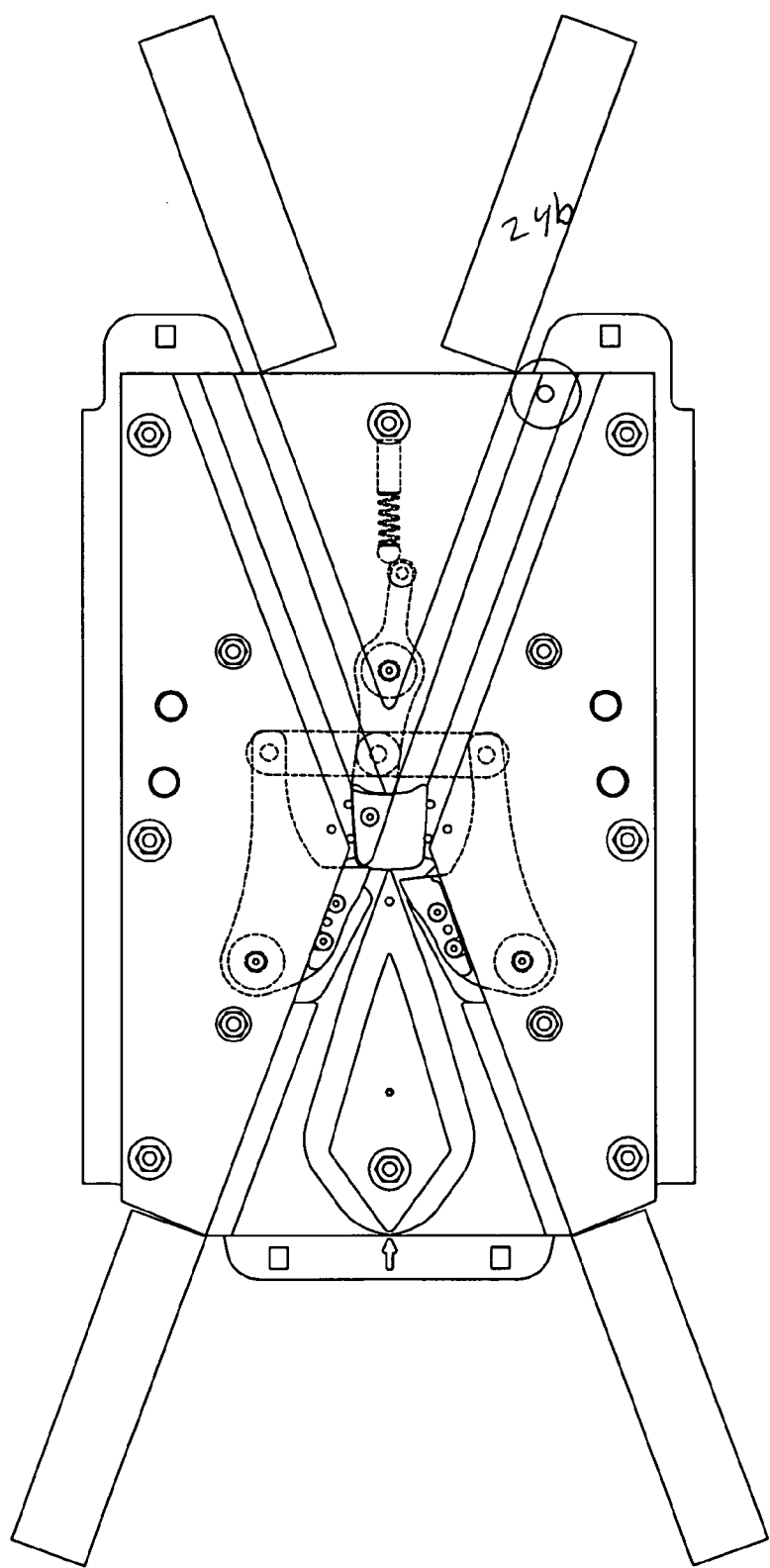

Referring to FIG. 18, there are two positions for the bearing and pin. In between these two positions, the load may be transferred from the pin on the inner lower surface 40d" to the bearing on inner upper surface 40c". The inner lower surface 40d" closes towards inner upper surface 40c" to effect this transfer, and may be straight or curved. Transfer from inner lower surface 40d" to inner upper surface 40c" must occur by the time the guide element exist crossover switch 30. As seen in FIG. 19, there is a waterfall as the bearing transitions to guide track 24b.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims submitted herewith.

What is claimed is:

1. A crossover switch for guiding pushers traveling in a downstream direction which have respective guide elements, said crossover switch comprising:
   a. a body defining a first divert guide path and a second divert guide path, said first and second guide paths configured complementarily to said guide elements, said first and second guide paths intersecting with each other at an intersection;
   b. a first actuator associated with said first divert guide path, said first actuator being moveable between a first position at which a portion of said first actuator is disposed within said first divert guide path and a second position at which there is clearance for said guide elements to pass through said first divert guide path;
   c. a second actuator associated with said second divert guide path, said second actuator being moveable between a first position at which a portion of said second actuator is disposed within said second divert guide path and a second position at which there is clearance for said guide elements to pass through said second divert guide path;

d. a switch arm pivotable about a first axis between a first switch position at which said first divert guide path is blocked by said switch, and a second switch position at which said second divert guide path is blocked by said switch, said first axis being disposed downstream of said intersection; and e. said first and second actuators being operably connected to said switch so that movement of said first actuator from its first position into its second position moves said switch into said second switch position, and that movement of said second actuator from its first position into its second position moves said switch into said first switch position.

2. A crossover switch for guiding pushers traveling in a downstream direction which have respective guide elements, said crossover switch comprising:

a. a body defining a first divert guide path and a second divert guide path, said first and second guide paths configured complementarily to said guide elements, said first and second guide paths intersecting with each other at an intersection;

b. a first actuator associated with said first divert guide path, said first actuator being pivotable about a first axis between a first position at which a portion of said first actuator is disposed within said first divert guide path and a second position at which there is clearance for said guide elements to pass through said first divert guide path, said first axis being disposed upstream of said intersection;

c. a second actuator associated with said second divert guide path, said second actuator being pivotable about a second axis between a first position at which a portion of said second actuator is disposed within said second divert guide path and a second position at which there is clearance for said guide elements to pass through said second divert guide path, said second axis being disposed upstream of said intersection;

d. a switch moveable between a first switch position at which said first divert guide path is blocked by said switch, and a second switch position at which said second divert guide path is blocked by said switch; and e. said first and second actuators being operably connected to said switch so that movement of said first actuator from its first position into its second position moves said switch into said second switch position, and that movement of said second actuator from its first position into its second position moves said switch into said first switch position.

3. The crossover switch of claim 2, wherein said first axis and second axis are not coincident.

4. The crossover switch of claim 2, wherein said first member comprises a first distal end spaced apart from said first axis, and said second member comprises a second distal end spaced apart from said second axis, further comprising:

(a) a member having a first and second end, and an intermediate portion disposed between said first and second end, said first end being pivotably connected to said first distal end, said second end being pivotably connected to said second end, and said intermediate portion being connected to said switch.

5. The crossover switch of claim 4, wherein said switch is pivotably connected to said intermediate portion.

6. The crossover switch of claim 5, wherein said switch is pivotable about a third axis so as to effect the movement of said switch between the first switch position and the second switch position.

7. The crossover switch of claim 2, wherein said a switch is pivotable about a third axis so as to effect the movement of said switch between the first switch position and the second switch position.

8. The crossover switch of claim 7, wherein said third axis is disposed downstream of said intersection.

9. A crossover switch for guiding pushers which have respective guide elements, said crossover switch comprising:

a. a body defining a first divert guide path and a second divert guide path, said first and second guide paths configured complementarily to said guide elements, said first and second guide paths intersecting with each other;

b. a first actuator associated with said first divert guide path, said first actuator being moveable between a first position at which a portion of said first actuator is disposed within said first divert guide path and a second position at which there is clearance for said guide elements to pass through said first divert guide path;

c. a second actuator associated with said second divert guide path, said second actuator being moveable between a first position at which a portion of said second actuator is disposed within said second divert guide path and a second position at which there is clearance for said guide elements to pass through said second divert guide path;

d. a switch moveable between a first switch position at which said first divert guide path is blocked by said switch, and a second switch position at which said second divert guide path is blocked by said switch; and e. a member comprising
  i. a first connection to said first actuator;
  ii. a second connection to said second actuator; and
  iii. a third connection to said switch, said third connection configured to allow relative motion between said member and said switch so that movement of said first actuator from its first position into its second position moves said switch into said second switch position, and that movement of said second actuator from its first position into its second position moves said switch into said first switch position, where in each of said first, second and third connections allow relative movement.

10. The crossover switch of claim 9, wherein said first connection is configured to allow relative motion between said member and said first actuator.

* * * * *